(12) United States Patent
Stefik

(10) Patent No.: US 8,165,985 B2
(45) Date of Patent: Apr. 24, 2012

(54) SYSTEM AND METHOD FOR PERFORMING DISCOVERY OF DIGITAL INFORMATION IN A SUBJECT AREA

(75) Inventor: Mark Jeffrey Stefik, Portola Valley, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 834 days.

(21) Appl. No.: 12/190,552

(22) Filed: Aug. 12, 2008

(65) Prior Publication Data

US 2009/0099996 A1    Apr. 16, 2009

Related U.S. Application Data

(60) Provisional application No. 60/998,636, filed on Oct. 12, 2007.

(51) Int. Cl.
G06F 15/00 (2006.01)
G06F 15/18 (2006.01)

(52) U.S. Cl. ............... 706/62; 706/45; 706/52; 706/55; 707/705; 707/709; 707/917

(58) Field of Classification Search ............... 706/54, 706/934
See application file for complete search history.

(56) References Cited

U.S. PATENT DOCUMENTS

| | | | |
|---|---|---|---|
| 5,257,939 A | 11/1993 | Robinson et al. | |
| 5,369,763 A | 11/1994 | Biles | |
| 5,530,852 A | 6/1996 | Meske et al. | |
| 5,671,342 A | 9/1997 | Millier et al. | |
| 5,680,511 A | 10/1997 | Baker et al. | |
| 5,724,567 A | 3/1998 | Rose et al. | |
| 5,784,608 A | 7/1998 | Meske et al. | |
| 5,907,677 A | 5/1999 | Glenn et al. | |
| 5,907,836 A | 5/1999 | Sumita et al. | |
| 5,953,732 A | 9/1999 | Meske et al. | |
| 6,021,403 A | 2/2000 | Horvitz et al. | |
| 6,052,657 A | 4/2000 | Yamron et al. | |
| 6,064,952 A | 5/2000 | Imanaka et al. | |
| 6,233,570 B1 | 5/2001 | Horvitz et al. | |
| 6,233,575 B1 | 5/2001 | Agrawal et al. | |
| 6,240,378 B1 | 5/2001 | Imanaka et al. | |
| 6,247,002 B1 | 6/2001 | Steels | |
| 6,269,361 B1 | 7/2001 | Davis et al. | |

(Continued)

FOREIGN PATENT DOCUMENTS

EP    1571579    9/2005

(Continued)

OTHER PUBLICATIONS

C. Holahan, "So Many Ads, So Few Clicks," BusinessWeek, p. 38 (Nov. 12, 2007).

(Continued)

*Primary Examiner* — Omar Fernanadez Rivas
(74) *Attorney, Agent, or Firm* — Patrick J. S. Inouye; Krista A. Wittman

(57) ABSTRACT

A system and method for performing discovery of digital information in a subject area is provided. Each of topics in a subject area, training material for the topics, and a corpus comprising digital information are designated. Topic models for each of the topics are built. The topic models are evaluated against the training material. The digital information from the corpus is organized by the topics using the topic models into an evergreen index.

25 Claims, 14 Drawing Sheets

U.S. PATENT DOCUMENTS

| | | | |
|---|---|---|---|
| 6,285,987 | B1 | 9/2001 | Roth et al. |
| 6,292,830 | B1 | 9/2001 | Taylor et al. |
| 6,397,211 | B1 | 5/2002 | Cooper |
| 6,598,045 | B2 | 7/2003 | Light et al. |
| 6,772,120 | B1 | 8/2004 | Moreno et al. |
| 6,804,688 | B2 | 10/2004 | Kobayashi et al. |
| 6,981,040 | B1 | 12/2005 | Konig et al. |
| 7,062,485 | B1 | 6/2006 | Jin et al. |
| 7,092,888 | B1 | 8/2006 | McCarthy et al. |
| 7,200,606 | B2 * | 4/2007 | Elkan ............... 707/999.102 |
| 7,275,061 | B1 | 9/2007 | Kon et al. |
| 7,281,022 | B2 | 10/2007 | Gruhl et al. |
| 7,293,019 | B2 | 11/2007 | Dumais et al. |
| 7,320,000 | B2 | 1/2008 | Chitrapura et al. |
| 7,426,557 | B2 | 9/2008 | Gruhl et al. |
| 7,467,202 | B2 * | 12/2008 | Savchuk ............... 709/224 |
| 7,496,567 | B1 | 2/2009 | Steichen |
| 7,548,917 | B2 | 6/2009 | Nelson |
| 7,567,959 | B2 | 7/2009 | Patterson |
| 7,600,017 | B2 | 10/2009 | Holtzman et al. |
| 7,685,224 | B2 | 3/2010 | Nye |
| 7,707,206 | B2 * | 4/2010 | Encina et al. ............ 707/716 |
| 7,747,593 | B2 | 6/2010 | Patterson et al. |
| 7,809,723 | B2 | 10/2010 | Liu et al. |
| 7,890,485 | B2 * | 2/2011 | Malandain et al. ...... 707/705 |
| 2002/0161838 | A1 | 10/2002 | Pickover et al. |
| 2004/0059708 | A1 | 3/2004 | Dean et al. |
| 2005/0097436 | A1 | 5/2005 | Kawatani |
| 2005/0226511 | A1 | 10/2005 | Short |
| 2005/0278293 | A1 | 12/2005 | Imachi et al. |
| 2006/0167930 | A1 | 7/2006 | Witwer et al. |
| 2007/0050356 | A1 | 3/2007 | Amadio |
| 2007/0156622 | A1 * | 7/2007 | Akkiraju et al. ............ 706/48 |
| 2007/0214097 | A1 | 9/2007 | Parsons et al. |
| 2007/0239530 | A1 | 10/2007 | Datar et al. |
| 2007/0244690 | A1 | 10/2007 | Peters |
| 2007/0260508 | A1 | 11/2007 | Barry et al. |
| 2007/0260564 | A1 | 11/2007 | Peters et al. |
| 2007/0271086 | A1 | 11/2007 | Peters et al. |
| 2008/0040221 | A1 | 2/2008 | Wiseman et al. |
| 2008/0065600 | A1 | 3/2008 | Batteram et al. |
| 2008/0126319 | A1 | 5/2008 | Bukai et al. |
| 2008/0133482 | A1 | 6/2008 | Anick et al. |
| 2008/0201130 | A1 | 8/2008 | Peters et al. |
| 2008/0307326 | A1 | 12/2008 | Gruhl et al. |
| 2010/0070485 | A1 | 3/2010 | Parsons et al. |
| 2010/0114561 | A1 | 5/2010 | Yasin |

FOREIGN PATENT DOCUMENTS

| | | |
|---|---|---|
| WO | 2005073881 | 8/2005 |
| WO | 2007047903 | 4/2007 |

OTHER PUBLICATIONS

Rocha L. M., "Adaptive Webs for Heterarchies With Diverse Communities of Users," Workshop From Intelligent Networks to the Global Brain: Evolutionary Technology, pp. 1-35 (Jul. 3, 2001).
Arasu et al., "Searching the Web," ACM, New York, NY, US, pp. 2-43 (Aug. 1, 2001).
P. Lenssen, "How Google News Indexes". See http://blogoscoped.com/archive/2006-07-28-n49.html.
A. Agarval, "How Google News works". http://labnol.blogspot.com/2005/05/how-google-news-works.html.
M. Helft, "How a Series of Mistakes Hurt Shares of United". New York Times. http://www.nytimes.com/2008/09/15/technology/15google.html?_r=1.
J. Preston, "Why Google News works." http://eatsleeppublish.com/why-google-news-works/.
Wikipedia, the Free Encyclopedia, "Google News". http://en.wikipedia.org/wiki/Google_News.
Imai et al., "Improved Topic Discrimination of Broadcast News Using a Model of Multiple Simultaneous Topics," 1997 IEEE International Conference on Acoustics, Speech, and Signal Processing (ICASSP'97), Apr. 1997, pp. 727-730, vol. 2.
Anonymous "TF-IDF," Wikipedia, the free encyclopedia (Jul. 23, 2007).
Akiko Aizawa, "An Information-Theoretic Perspective of TF-IDF Measures," Information Processing and Management, Elsevier Science Ltd. , vol. 39, No. 1, pp. 45-65 (Jan. 1, 2003).
C. Anderson, "The Long Tail: Why the Future of Business is Selling Less of More," 2006, Chapter 1, pp. 1-26, Hyperion Press, New York.
Schutze H., "The Hypertext Concordance: A Better Back-of-the-Book Index," 1998, Proceedings of Workshop on Computational Technology, pp. 101-104, Montreal, Canada.
Arampatzis et al., "An Evaluation of Linguistically-Motivated Indexing Schemes," 2000, Proceedings of the BCSIRSG.
Biebricher et al., "The Automatic Indexing System AIR/PHYS—1997, From Research to Application," In Readings in Information Retrieval, Morgan Kaufmann Publishers, San Francisco.
G. Sacco, "Dynamic Taxonomies and Guided Searches," Journal of the American Society for Information Science and Technology, vol. 57, Issue 6, Apr. 2006.
Rajashekar et al., "Combining Automatic and Manual Index Representations in Probabilistic Retrieval," www.google.com.
Haav et al., "A Survey of Concept-Based Information Retrieval Tools on the Web," http://greta.cs.ioc.ee/~helemai/HaavLubiADBIS2001.pdf.
Brin et al., "The Anatomy of a Large-Scale Hypertextual Web Search Engine," Paper presented at the Seventh International Conference on World Wide Web. Apr. 14-18, 1998, Brisbane, Australia.
Card et al., "Readings in Information Visualization: Using Vision to Think," 1999, Section 3 Interaction, pp. 231-259, 295-306, Morgan Kaufmann Publishers, San Francisco.
Chi et al., "EBooks With Indexes that Reorganize Conceptually," Paper presented at Human Factors in Computing Systems Conference Apr. 24-29, 2004, Vienna, Austria.
G. W. Furnas, "Generalized Fisheye Views," Paper presented at the Conference on Human Factors in Computing Systems, 1986, Boston, Massachusetts.
Kusek et al., "The Future of Music: Manifesto for the Digital Music Revolution," Boston: Berklee Press, 2005.
P. Pirolli, "Information Foraging Theory: Adaptive Interaction with Information," Oxford: Oxford University Press, 2007.
H. Simon, "Designing Organizations for an Information-Rich World." In Communications and the Public Interest, ed. Martin Greenberger. 37-72. The Johns Hopkins Press, 1971.
R. D. Burt, "Structural Holes and Good Ideas," American Journal of Sociology, vol. 110, No. 2, pp. 349-399, 2003.
C. Mezei, "The Digg Algorithm-Unofficial FAQ," SeoPedia, www.secopedia.org/tips-tricks/social-media/the-digg-algorithm-unofficial-faq, Nov. 2, 2006.
N. Patel, "There's More to Digg Than Meets the Eye," Pronet Advertising, www.pronetadvertising.com/articles/theres-more-to-digg-than-meets-the-eye.html, Jan. 15, 2007.
J. Dowdell et al., "Digg's Kevin Rose on Recent Indiggnation: Fact vs. Fiction," Marketing Shift, www.marketingshift.com/2006/9/diggs-kevin-rose-recent-indiggnation.cfm, Sep. 7, 2006.
G. A. Miller, "The Magical Number Seven, Plus or Minus Two: Some Limits on Our Capacuty for Processing Information," Psychological Review, vol. 63, pp. 81-97, 1956.
J. Dowdell, "Digg Algorithm for Scoring Stories," Marketing Shift, www.marketingshift.com/2006/9/diggs-algorithm-elements-confirmed.cfm, Sep. 8, 2006.
Nakashima et al., "Information Filtering for the Newspaper," 1997 IEEE Pacific RIM Conference NCE on Victoria, BC, Canada (Aug. 20-22, 1997), vol. 1, pp. 142-145 (Aug. 1997).
Bracewell et al., "Reading: A Self Sufficient Internet News System with Applications in Information and Knowledge Mining," Natural Language Processing and Knowledge Engineering, International Conference, IEEE, PI, pp. 190-196 (Aug. 1, 2007).
Yu et al, "PEBL: Positive Example Based Learning for Web Page Classification Using SVM," Proc. of ACM SIGKDD International Conference on Knowledge Discovery and Data Mining (2002), 10 pages.

* cited by examiner

SYSTEM AND METHOD FOR PERFORMING DISCOVERY OF DIGITAL INFORMATION IN A SUBJECT AREA

CROSS-REFERENCE TO RELATED APPLICATION

This non-provisional patent application claims priority under 35 U.S.C. §119(e) to U.S. Provisional Patent Application Ser. No. 60/998,636, filed Oct. 12, 2007, the disclosure of which is incorporated by reference.

FIELD

This application relates in general to digital information sensemaking and, in particular, to a system and method for performing discovery of digital information in a subject area.

BACKGROUND

Digital sensemaking is sensemaking mediated by a digital information infrastructure, such as the Worldwide Web ("Web"). Through the Web, users can access both "traditional" Web sites that post information from diverse sources and interactive Web sites, including moderated Web logs or "blogs," user forums, and Web sites with voting, which allow users to actively rank new information.

As a digital information repository, the Web continually evolves as events occur, ideas get synthesized, and new trends emerge. New information is posted continuously. Mainstream media Web sites generally cover popular topics, such as news, business, politics, sports, entertainment, and weather, but a host of additional topics exist through other Web sources. These topics range from slightly less popular topics, for instance, technology news, to specialized or obscure topics that are relevant to a comparatively small number of people, such as evening class schedules for a local community college.

The demand for items in many markets follows a "Long Tail" distribution, such as described in C. Anderson, *The Lone Tail: Why the Future of Business is Selling Less of More*, (Hyperion Press) (2006), the disclosure of which is incorporated by reference. FIG. 1 is a graph showing, by way of example, a hypothetical long tail distribution 10 for digital information. The x-axis represents digital information and they-axis represents popularity level. Items appearing at the head of the distribution 11, although few in number, enjoy the greatest popularity, such as media stories falling into a small number of popular categories. However, more items along the "long tail" 12, which cover niche topics with smaller readerships, outnumber head items 11. Although any single head item 11 enjoys greater popularity than any one of the long tail items 12, the aggregate popularity of a large enough group of long tail items 12 will exceed the popularity of all head items 11 when enough long tail items 12 are included, which implies that a larger overall audience could be reached by focusing on long tail topics, provided the audience can be made aware of them.

Consumers of information have only a limited amount of time and cannot pay attention to everything. As more topics become available, mainstream topics receive a shrinking fraction of readers' attention. Analogously, prime time television audiences are currently shrinking, as cable and satellite networks improve their programming and increase their viewership. Similarly, musical "hits" today sell fewer copies than sold a decade ago, as more choices and purchasing options become available. The economics and popularity trends from these observations can be succinctly summarized: "if you give people choices, they take them" and "the head of the distribution is shrinking."

The problem is not only finding new or popular information: the problem is finding new information that is relevant to a user's specific needs, that is, new information on the "long tail." Existing approaches fall short. Web search engines, for example, passively retrieve Web content in response to user queries and frequently favor old information. The Goggle search engine, for instance, is based on the Page Rank algorithm, which depends on inter-page hyperlinks to estimate authoritativeness and popularity. Web pages that are most cited by other Web pages are assumed best, yet may not actually be the most relevant.

Similarly, online news services are frequently aligned with mainstream media sources, which group news into a handful of popular topics, although specialized topics are sometimes available through syndication feeds. Online news aggregators correspondingly provide consolidated summarizations of news from multiple sources, but often fail to coherently group news under appropriate topics or categorize news into fine grains. As a result, readers are faced with a confusing blend of articles on disparate topics whenever they try to follow a story or topic. A reader may begin by reading articles under a technology topic to follow a new computer phone. However, the phone articles may end up mixed in with other technology articles and be scattered across the news aggregator's Web site. Searching for phone articles by keywords also may not correctly match all relevant articles. Thus, online news services and news aggregators lack sufficient granularity to enable the reader to only receive the best and most relevant articles delivered in a way that facilitates easily following developments on a topic.

Finally, news Web sites with voting invite users to vote on news stories. The highest ranking content is promoted to the front page, such as through the Digg Web site. Digg categorizes articles into a handful of topics, which each use different front page promotion algorithms. Only articles that have received sufficient "diggs" appear on a front page and only registered users can submit, comment on, and promote articles. The topics consequently reflect popular topics at the head of a long tail distribution. Voting has been criticized as susceptible to collusion, suppression, and paid promotion, such as described in C. Mezel, "The Digg Algorithm—Unofficial FAQ," *SeoPedia*, (Nov. 2, 2006); N. Patel, "There's More to Digg Than Meets the Eye," *Pronet Advertising*, (Jan. 15, 2007); and J. Dowdell et al., "Digg's Kevin Rose on Recent Indiggnation Fact vs. Fiction," *Marketing Shift*, (Sep. 7, 2006), the disclosures of which are incorporated by reference.

Therefore, a need remains in digital sensemaking for discovering new, relevant, and authoritative digital information that is automatically categorized within topics for a particular subject area and emphasized at a personal level.

SUMMARY

A system and method for facilitating the automatic discovery of digital information provides what's new, what's true, and what matters. "What's new" means delivering current information. "What's true" means information from multiple sources is socially vetted to establish level of interest and authoritativeness. "What matters" means that information is automatically categorized according to important topics in a reader's subject area.

New and relevant digital information is discovered by utilizing fine-grained topical indexes shepherded by knowledge domain experts, the "hard work of the few;" by aggregating rankings and suggestions about better categorizing by a large augmented community of readers, "the light work of the many" or "the wisdom of crowds;" and by extending the topical indexes though machine-assisted learning, the "tireless work of the machines." In one embodiment, an evergreen index is trained from topical indexes and extrapolated over a corpus of digital information, such as Web pages or other online content. The term "evergreen" is intended to connote a quality of freshness and currency for an index, so that new articles will be classified automatically and added to the index when they appear and that new topics can be added to the index as needed.

Each augmented community has an evergreen index, which includes topic models, such as patterns, for each topic and subtopic that can be used to test whether given material is on point. The topic models are generated by applying supervised machine learning or other means, and are applied to new material to automatically categorize the material under the evergreen index's topics. Articles from a corpus of documents are matched against the topic models and provided to the augmented community to vet, that is, collaboratively vote and rate.

One embodiment provides a system and method for performing discovery of digital information in a subject area. Each of topics in a subject area, training material for the topics, and a corpus comprising digital information are designated. Topic models for each of the topics are built. The topic models are evaluated against the training material. The digital information from the corpus is organized by the topics using the topic models into an evergreen index.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Glossary

Figure 1:
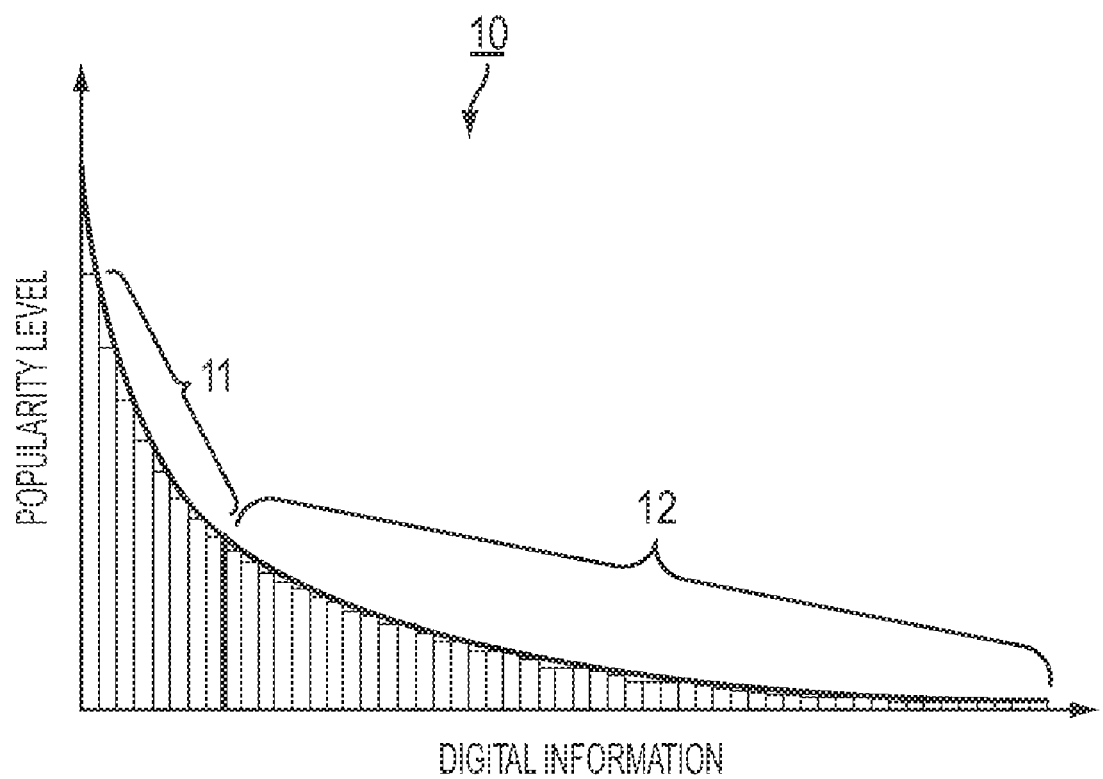
FIG. 1 is a graph showing, by way of example, a hypothetical long tail distribution for digital information.

The following terms are used throughout and, unless indicated otherwise, have the following meanings:

Corpus: A collection or set of articles, documents, Web pages, electronic books, or other digital information available as printed material.

Document: An individual article within a corpus. A document can also include a chapter or section of a book, or other subdivision of a larger work. A document may contain several cited pages on different topics.

Cited Page: A location within a document to which a citation in an index, such as a page number, refers. A cited page can be a single page or a set of pages, for instance, where a subtopic is extended by virtue of a topic model and the set of pages contains all of the pages that match the topic model. A cited page can also be smaller than an entire page, such as a paragraph, which can be matched by a topic model.

Subject Area: The set of topics and subtopics in a social index, including an evergreen index.

Topic: A single entry within a social index. In an evergreen index, a topic is accompanied by a topic model, such as a pattern, that is used to match documents within a corpus.

Subtopic: A single entry hierarchically listed under a topic within a social index. In an evergreen index, a subtopic is also accompanied by a topic model.

Community: A group of people sharing main topics of interest in a particular subject area online and whose interactions are intermediated, at least in part, by a computer network. A subject area is broadly defined, such as a hobby, like sailboat racing or organic gardening; a professional interest, like dentistry or internal medicine; or a medical interest, like management of late-onset diabetes.

Augmented Community. A community that has a social index on a subject area. The augmented community participates in reading and voting on documents within the subject area that have been cited by the social index.

Evergreen Index: An evergreen index is a social index that continually remains current with the corpus.

Social Indexing System: An online information exchange infrastructure that facilitates information exchange among augmented communities, provides status indicators, and enables the passing of documents of interest from one augmented community to another. An interconnected set of augmented communities form a social network of communities.

Information Diet: An information diet characterizes the information that a user "consumes," that is, reads across subjects of interest. For example, in his information consuming activities, a user may spend 25% of his time on election news, 15% on local community news, 10% on entertainment topics, 10% on new information on a health topic related to a relative, 20% on new developments in their specific professional interests, 10% on economic developments, and 10% on developments in ecology and new energy sources. Given a system for social indexing, the user may join or monitor a separate augmented community for each of his major interests in his information diet.

Digital Sensemaking

Figure 2:
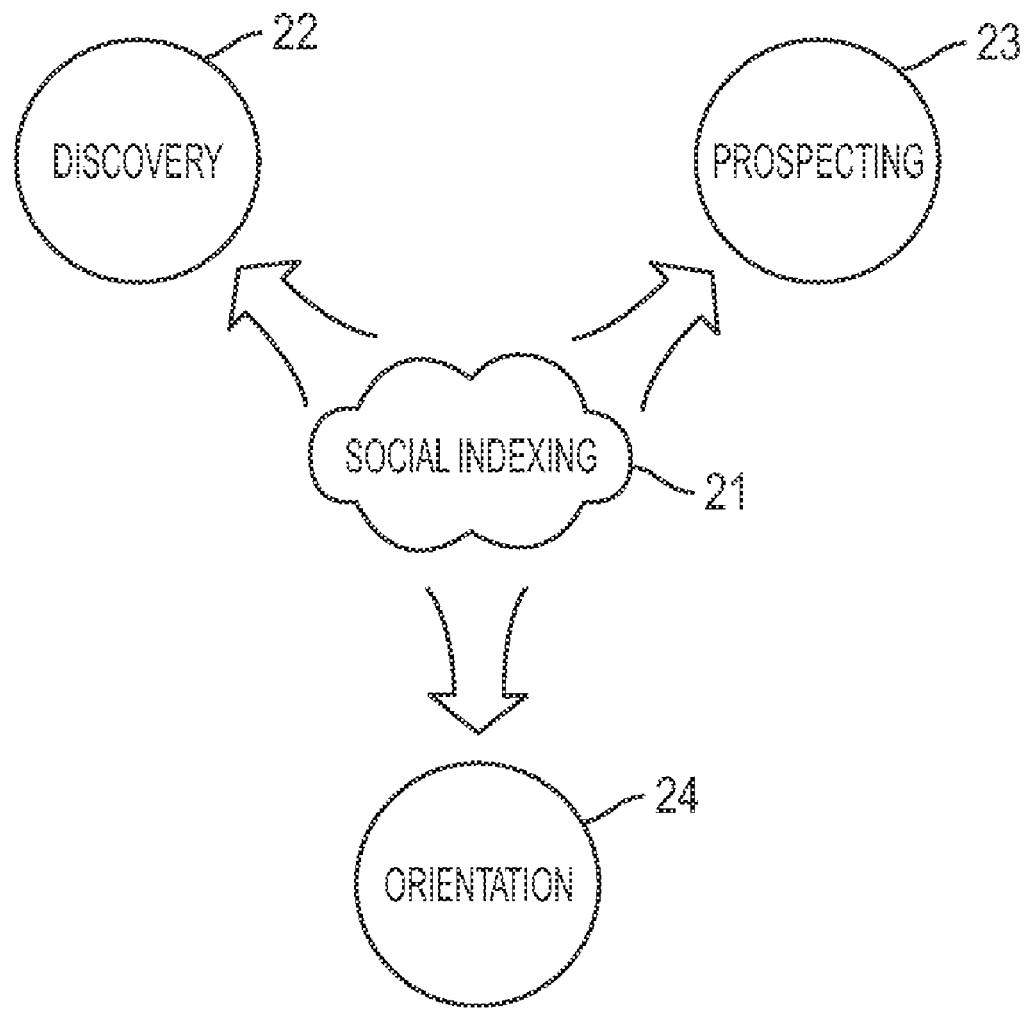
FIG. 2 is a functional block diagram showing challenges in digital sensemaking.

The Web and other online information resources provide an ever-evolving and expanding source of digital information. Digital sensemaking is about making sense out of the information in these resources. FIG. 2 is a functional block diagram 20 showing challenges in social indexing 21: digital information discovery 22, prospecting 23, and orientation 24. Other challenges are possible. These challenges represent different facets of information foraging, which work synergistically to provide new, relevant, and authoritative digital information through a topically fine-grained and socially-vetted infrastructure. Each challenge will now be summarized.

Figure 6:
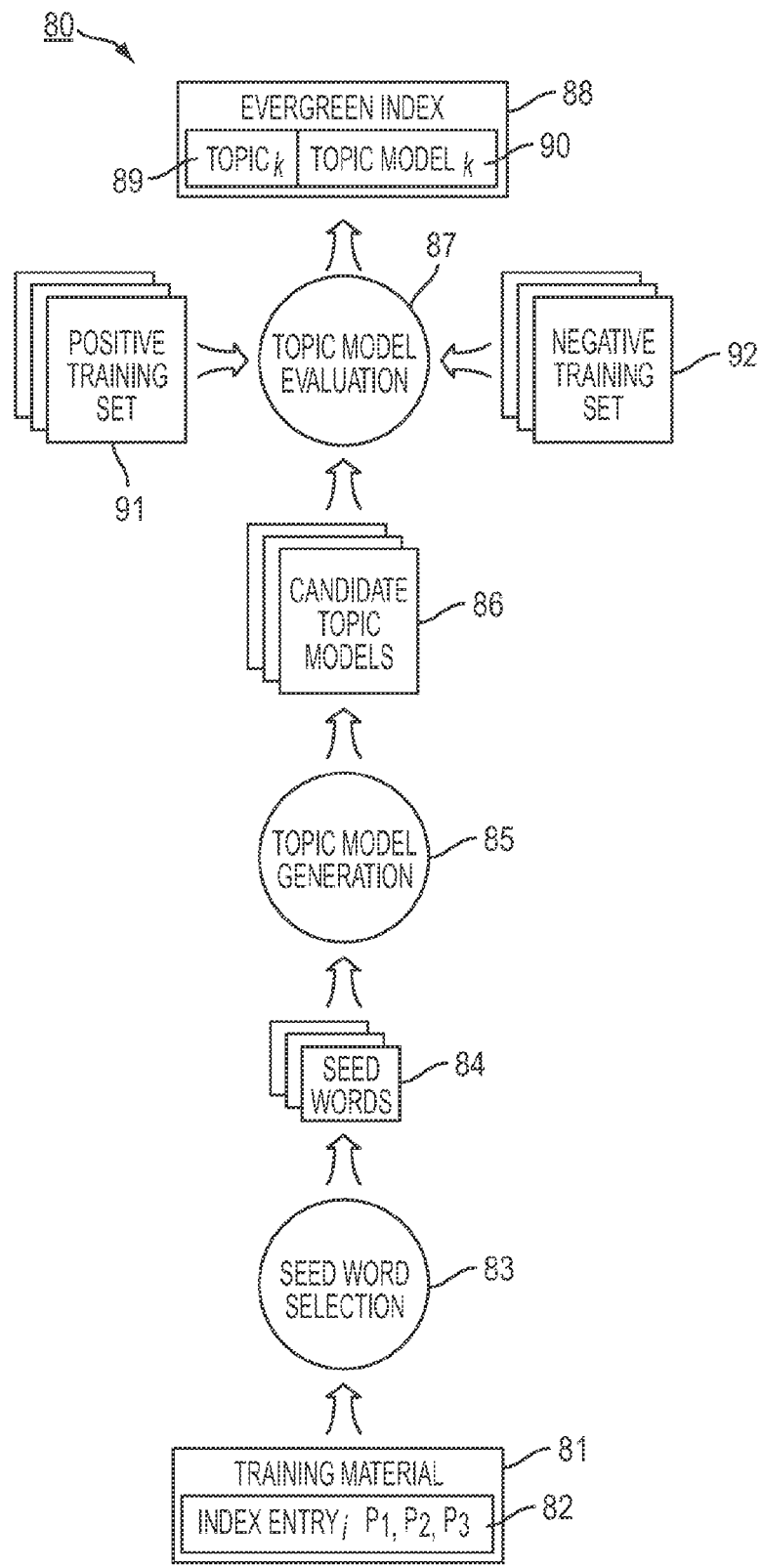
FIG. 6 is a data flow diagram showing index training in accordance with one embodiment.

Digital information discovery 22, the focal point of this application, focuses on identifying new and topically-relevant information for a set of core interests, as further described below beginning with reference to FIG. 6. Digital information discovery begins with the premise that each person has a set of core interests with a need for information spanning multiple topics within the core interests, including long tail topics, with varying levels of importance. The key challenge is in efficiently tracking new information on the core interests.

Digital information prospecting 23 focuses on foraging or mining an individual's information frontier as an aid to idea synthesis, as further described in commonly-assigned U.S. patent application, entitled "System and Method for Prospecting Digital Information," Ser. No. 12/190,560, filed Aug. 12, 2008, pending, the disclosure of which is incorporated by reference. Information prospecting expands an individual's information diet beyond existing interests, as fundamentally satisfied through digital information discovery 22, by tapping into a social network of communities. For example, information frontiers for local news includes news from neighboring towns and cities. As another example, information frontiers for a professional interest, such as family dentistry, potentially includes relevant topics from related fields, for instance, dental hygiene, new dental materials, and perhaps new antibiotics or results from cosmetic dentistry. Digital information prospecting facilitates efficient attention allocation without risking the distractions or inefficiencies in covering uncharted new topical ground. The key challenge is in finding the most relevant information from neighboring subject areas along the frontier.

Finally, digital information orientation 24 is about becoming oriented to an unfamiliar subject area, as further described in commonly-assigned U.S. patent application, entitled "System and Method for Providing Orientation into Digital Information," Ser. No. 12/190,557, filed Aug. 12, 2008, pending, the disclosure of which is incorporated by reference. Digital information orientation is about efficiently gaining an understanding of a new subject area. This activity is complementary to information discovery and prospecting information frontiers, reflecting the case where the objective is to explore an area to learn about the subject matter generally. The activity includes learning the topic structure and main results, as well as identifying good references.

Digital Information Sensemaking Environment

Figure 3:
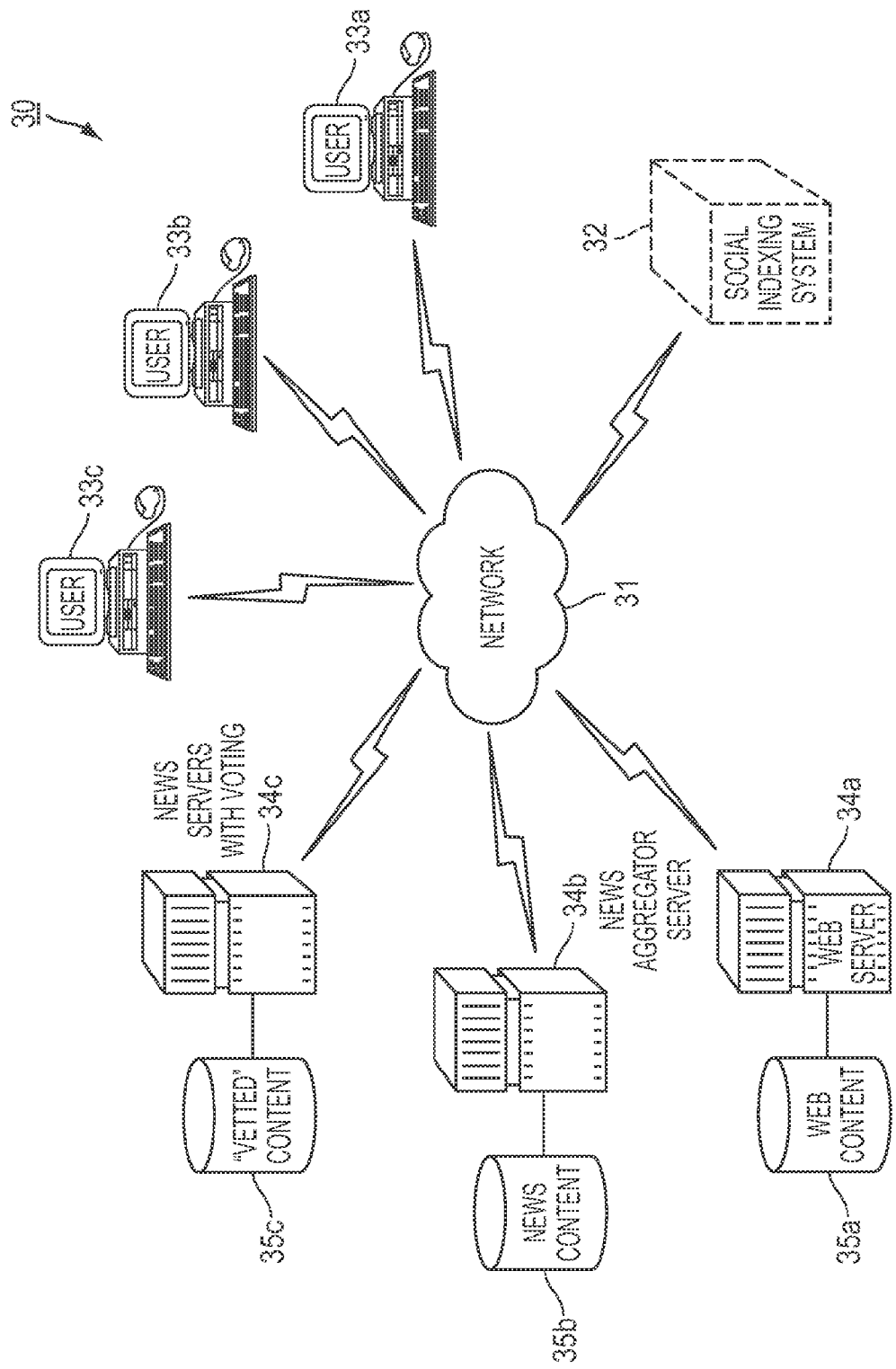
FIG. 3 is a block diagram showing an exemplary environment for digital information sensemaking.

Digital sensemaking is sensemaking mediated by a digital information infrastructure, which includes public data networks, such as the Internet, standalone computer systems, and various repositories of digital information. FIG. 3 is a block diagram showing an exemplary environment 30 for digital information sensemaking. The same basic system components are utilized for digital information discovery 22, prospecting 23, and orientation 24.

Digital information is information available in digital form. A digital data communications network 31, such as the Internet, provides a suitable digital information exchange infrastructure, although other infrastructures are possible, for instance, a non-public corporate enterprise network. The network 31 provides interconnectivity to various information sources and information consumers that respectively provide and access the digital information. Web servers 34a, news aggregator servers 34b, news servers with voting 34c, and other digital information repositories serve as information sources. These sources respectively serve Web content 35a, news content 35b, community-voted or "vetted" content 35c, and other digital information to user devices 33a-c, such as personal computers and similar devices, that function as the information consumers.

In general, each user device 33a-c is a Web-enabled device that executes a Web browser or similar application, which supports interfacing to and information exchange with the servers 34a-c. Both the user devices 33a-c and servers 34a-c include components conventionally found in general purpose programmable computing devices, such as a central processing unit, memory, input/output ports, network interfaces, and non-volatile storage, although other components are possible. Moreover, other information sources in lieu of or in addition to the servers 34a-c, and other information consumers, in lieu of or in addition to user devices 33a-c, are possible.

Digital sensemaking and, in particular, digital information discovery 22, is facilitated by a social indexing system 32, which is also interconnected to the information sources and the information consumers via the network 31. The social indexing system 32 facilitates the automated discovery and categorization of digital information into core topics within the subject area of an augmented community.

Social Indexing System

Figure 4:
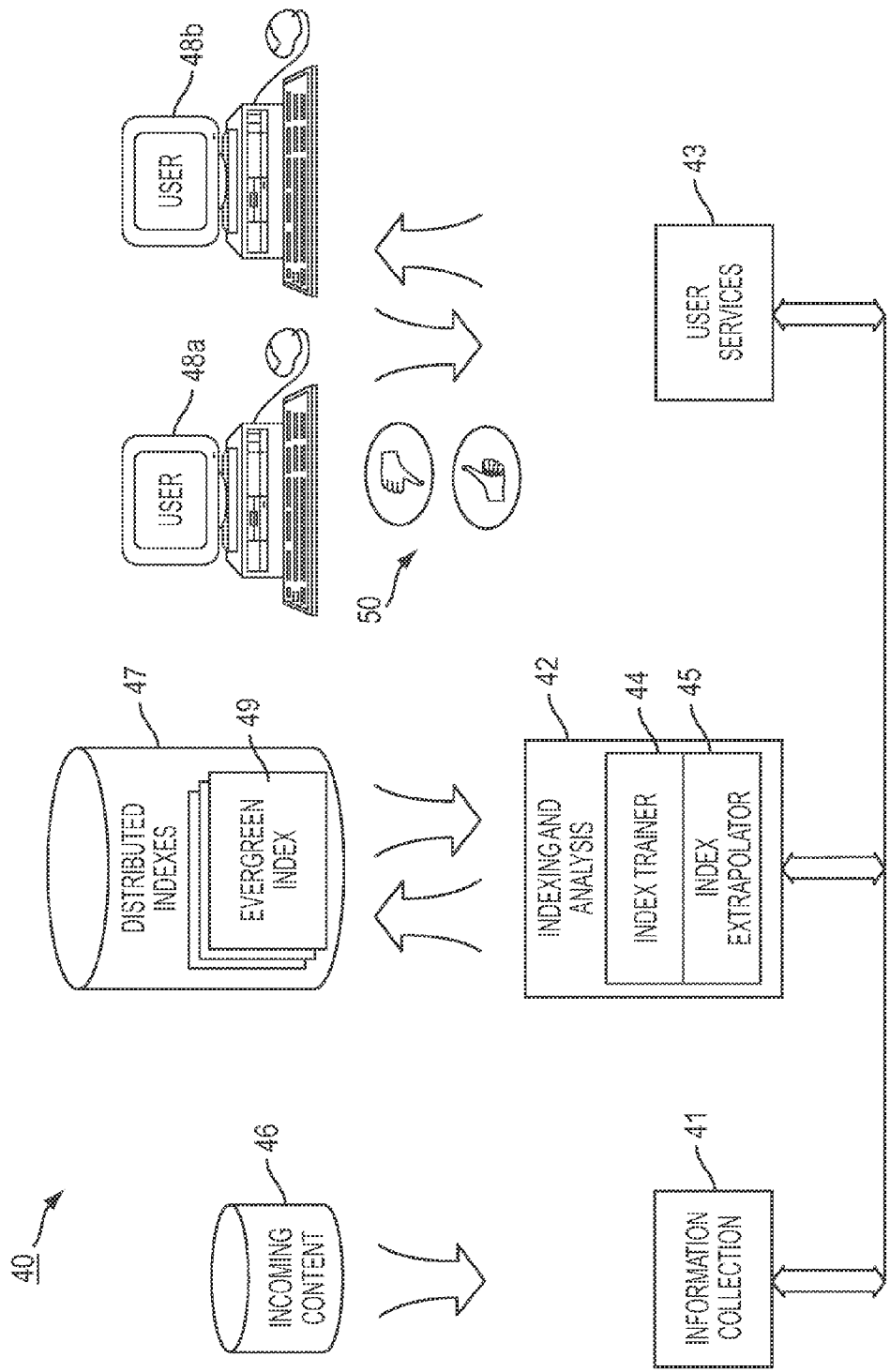
FIG. 4 is a functional block diagram showing principal components used in the social indexing system of FIG. 3.

From a user's point of view, the social indexing system appears as a single information portal, but is actually a set of services provided by an integrated digital information processing environment. FIG. 4 is a functional block diagram showing principal components 40 used in the social indexing system 32 of FIG. 3. The components are focused on digital information discovery and other components may be used to provide digital information prospecting, orienting, degree of interest, and other services.

The components 40 can loosely be grouped into three functional areas, information collection 41, indexing and analysis 42, and user services 43, although other functional areas are possible. The functional groups are interconnected and interdependent and can be implemented on the same or separate computational platforms. Information collection 41 obtains incoming content 46, such as Web content 35a, news content 35b, and "vetted" content 35c, from information sources, including Web servers 34a, news aggregator servers 34b, and news servers with voting 34c. The incoming content 46 is collected by a media collector operating under the direction of a scheduler to periodically or on-demand harvest new information from the information sources. The incoming content 46 can be stored in structured repository, or indirectly stored by saving only references or citations to the incoming content in lieu of maintaining an actual copy of the incoming content locally, such as storing hyperlinks.

Indexing and analysis 42 provides index training and extrapolation. New evergreen indexes 49 are trained through an index trainer 44, which bootstraps training material (not shown) into an evergreen index 49, as further discussed below beginning with FIG. 6. The incoming content 46 is automatically categorized into topics for particular subject areas under the evergreen indexes 49 by an index extrapolator 45, as further discussed below beginning with FIG. 11.

Finally, user services 43 provide a front-end to users 48a-b to access the distributed indexes 47 and the incoming content 46. Each evergreen index 49 is tied to a community of users, known as an "augmented" community, which has an ongoing interest in a core subject area. The community "vets" information cited by voting 50 within the topic to which the information has been assigned, as further discussed below beginning with FIG. 12.

Digital Information Discovery

An information "diet" characterizes what information a user consumes across subjects of special interest, as well as select content from frontier augmented communities, such as described in commonly-assigned U.S. patent application, entitled "System and Method for Prospecting Digital Information," Ser. No. 12/190,560, filed Aug. 12, 2008, pending, the disclosure of which is incorporated by reference. The diet also reflects the amount of time that the user is willing to allocate to "digesting" each subject. Digital information discovery satisfies the first aspect of a diet, information in subjects of special interest.

Figure 5:
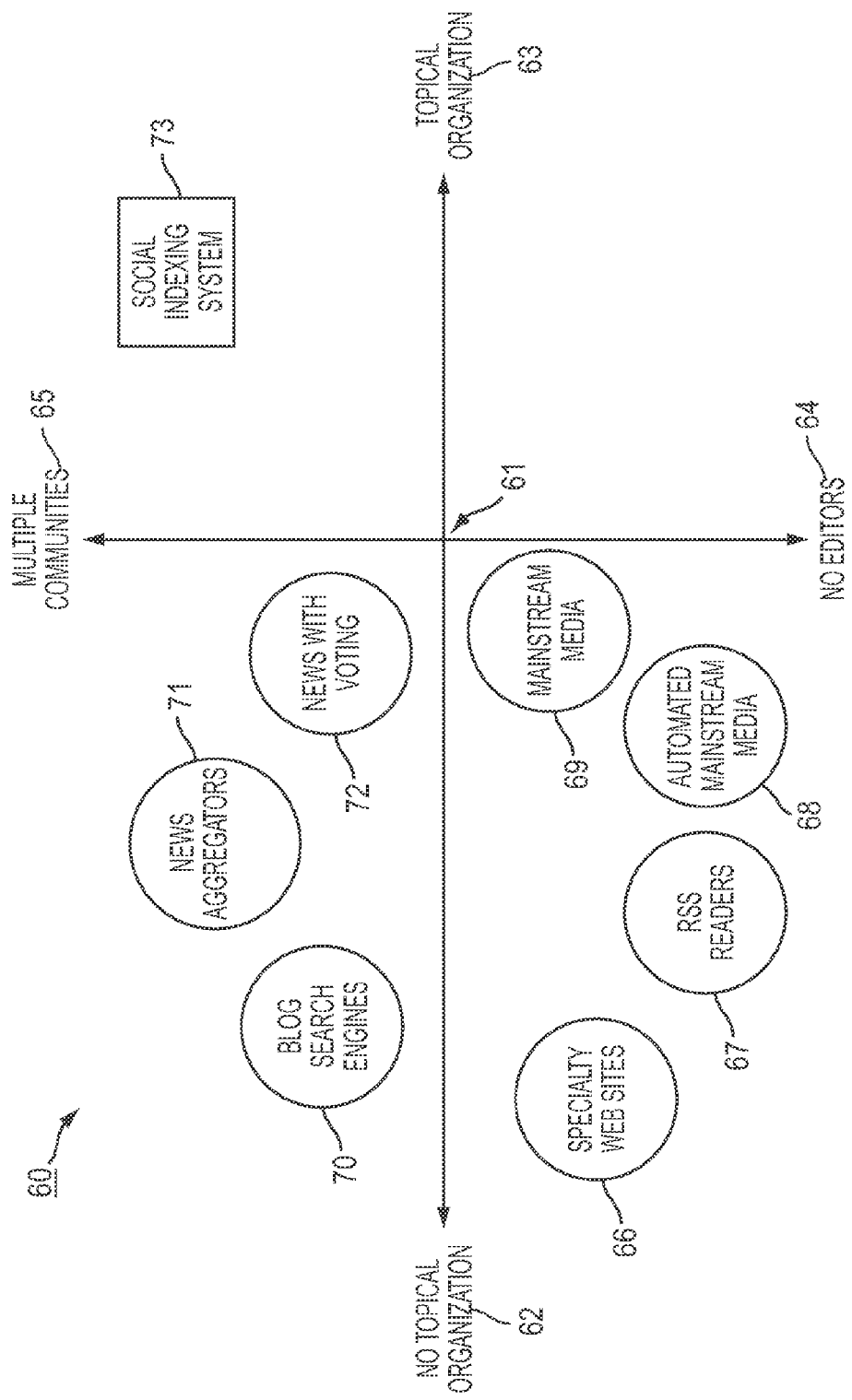
FIG. 5 is a graph showing, by way of example, the current organizational landscape of providers of digital information.

Discovering relevant and authoritative digital information to meet a user's information diet is important. Although all manner of data is widely available online, "raw" digital information obtained directly from a source generally lacks a comprehensive organizational scheme and competent ranking methodology. FIG. 5 is a graph 60 showing, by way of example, the current organizational landscape of providers of digital information. The bidirectional x-axis represents degree of topical organization of digital information and the bidirectional y-axis represents the amount of critical review, that is, "vetting." Information at the far left 62 of the x-axis lacks cohesive topical organization and refers to a single subject area. Under conventional approaches, the information is fairly static and organization is limited to a few topics. Information at the far right 63 of the x-axis enjoys a fine-grained and rich topical organization and covers multiple subject areas. Each subject area is deeply organized into many subtopics.

The y-axis characterizes the amount of expertise and labor that is used for "vetting" and ranking articles. No editing is performed on articles at the bottom of the y-axis and the articles are presented without any vetting. Closer to the origin 61, a small team of up to a few editors are engaged in vetting articles. Higher on the y-axis, a single community of people, "the light work of the many" and "the wisdom of the crowd," actively reads and votes, or vets, articles. Multiple communities vet articles at the top of the y-axis, where each community focuses on a specific subject area.

At best, current approaches are coarsely organized and only lightly critically weighed, or "vetted." For instance, in the southwest quadrant, conventional organizational approaches use either a broad, coarse grained or non-existent topical organization 62 with vetting by few or no editors 64. Specialty Web sites 66, such as Audiophilia, and hybridcars, serve narrow readership bases shepherded by a single dedicated editor with subject matter centered on a niche topic under which further topical organization is neither needed nor desired. RSS readers 67, such as Google reader, automatically report new information under an automated feed on a dedicated topic. Similarly, automated mainstream media Web sites 68, such as Google news, use limited popular news categories under which information is automatically grouped without the need for an editor. The categorizing of articles, however, is limited by a very course grain, where the classification of articles in such broad categories can be done by selecting articles from single-topic sources, such as technology or sports news. Finally, mainstream media Web sites 69, such as the New York Times, and clnet, employ individual editors or small teams of editors that organize news into popular news categories, which may include a wider scope to topics than available through automated mainstream media Web sites 68. The lack of community-based and presumptively impartial vetting, and the lack of fine-grained topic organization prevent these approaches from providing information covering a wide range of subject areas that is relevant to augmented communities that are interested in them, or to neighboring communities who may be interested in them.

In slight contrast, in the northwest quadrant, current approaches also use either a broad, coarse grained or non-existent topical organization 62 and offer vetting by individual or small communities of users 65. Blog search engines 70, such as Google blog search, and icerocket, are Web search engines dedicated to blogs, but the blogs are passively searched without use of topical organization. News aggregators 71, such as Topix, automatically collect news organized by zip code into broad, and usually popular, topic areas with limited community-based review. Finally, news Web sites with voting 72, such as Slashdot, reddit, and digg, offer slightly finer grained yet still relatively large topic categories with vetting by a single user community. Opening critical review to individual or small user communities increases impartiality and, therefore, user confidence in authoritativeness, but the similar lack of fine-grained topic organization prevents customized discovery of new relevant information. The northwest quadrant approaches are also limited to single user communities, as typified by the "techie-gamer" communities that frequent the Redditt and Digg Web sites, or, like the Topix Web site, have multiple communities, but do not have fine-grained topic coverage or diverse subject areas. Still, other approaches exist, such as Daylife, which has more topics than typical news Web sites, yet does not organize information into hierarchical topical indexes with fine-grained topics. Moreover, the site is not organized into communities with members and their indexes, nor can users define new communities.

In contrast to the foregoing conventional approaches, the organizational approach described herein uses: (1) index training and extrapolation to enable the right-end of the x-axis, and (2) voting in multiple augmented communities to enable the top-end of the y-axis. The social indexing system 73 uniquely occupies the northeast quadrant by providing fine-grained topical organization 63 through evergreen indexes 49 in conjunction with vetting by multiple user communities 65. The social part refers to the human element in the process. This organizational approach and community-based vetting ensures that each user receives both relevant and authoritative information in all of his subject areas of interest.

Evergreen Index Overview

Conventional indexes are static and fixed to their corpus. For example, an index based on concordances includes listings of words and phrases mechanically selected from their immediate context within a corpus. Concordance indexes are generated with neither the benefit of domain expertise nor historical insight. As a result, concordance indexes fail to distinguish important from trivial material. In contrast, evergreen indexes evolve dynamically with changes to the corpus. An evergreen index identifies and relates materials along expert-chosen topical joints, which reflect the expert's point of view on behalf of his augmented community as to material that is important. An evergreen index embodies judgments of how people in the augmented community will use the information cited and reflects a subject matter expert's articulation of important topics and references to where the topics are discussed.

The division of information into fine-grained categories enables several capabilities, including providing the capability to segregate article votes into fine-grained topic groups, rather than just one or a few large subject area groups. This capability also enables the estimating of article quality on a fine grain, and provides meaningful comparison of articles within a topic. Absent this capability, the utility of voting is mainly for determining "most popular" stories. Long tail stories, that is, stories of narrow interest, essentially disappear from view. Another benefit of hierarchical topic organizations makes possible the ability to associate user-editable "wiki-like" commentary with each topic in a community. This ability provides a place for community discussion and summarization of each topic.

An evergreen index is created by a process of index extrapolation using supervised machine learning. This topic will now be discussed in detail.

Index Training

The breadth of an evergreen index is tied to the scope of its augmented community's interests and is well-suited to digital information discovery. An evergreen index can be created by starting with a conventional index and applying supervised machine learning, although other approaches are possible. FIG. 6 is a data flow diagram showing index training 80 in accordance with one embodiment. The method is performed as a series of process steps by a server or other computing device.

An evergreen index 88 is trained by starting with training material 81. Each index entry 82 in the training material 81 specifies a topic or subtopic, and a set of citations to pages of documents in a corpus. An evergreen index being rebuilt will generally be used as the training material 81.

Index training occurs in three phases. During the first phase, seed words 84 are selected for each of the set of topics and subtopics in the training material 81 (operation 83), as further described below with reference to FIG. 7. During the second phase, candidate topic models 86, such as patterns, are generated from the seed words (operation 85), as further described below with reference to FIG. 8. Finally, during the third phase, the candidate topic models 86 are evaluated against positive and negative training sets 91, 92 (operation 87), as further described below with reference to FIG. 9. The evergreen index 88 is formed by pairing each topic or subtopic 89 with a topic model 90.

Index training is performed in the same manner for both creating a new evergreen index 88 and to rebuild an existing evergreen index 88. However, different training sets 91, 92 are used when rebuilding an evergreen index. When an index is retrained, there are several sources of change. New sources may have been added to the community, which may affect the baseline. Similarly, new articles may have arrived in the community, which may also affect the baseline. Additionally, new topics may be added, some topics may be deleted, and some topics may be renamed, the latter of which may affect biasing. Moreover, the positive and negative training examples may be changed. Typically in a retraining, most of the topics are the same as the previous training with perhaps a few new topics added. Typically, new articles have arrived. The training examples are changed in a few topics where an augmented community leader or members think that the articles arriving are not on topic. In other words, articles on a topic may be missed or articles that are not really on a topic are erroneously showing up. Thus, retraining shifts the patterns and therefore the selection of articles.

Supervised machine learning is applied when evaluating candidate topic models 86 and the best topic models found constitute the "learning." The difference between one training session and another is basically the selection of examples in the positive and negative training sets 91, 92 that are used. Overall, the process involves:

1) specifying one or more articles as positive examples for a topic in an evergreen index;

2) training the evergreen index to get a pattern, that is, topic model;

3) matching the topic model against the corpus and yielding a set of matching articles;

4) if some of the matched articles are off topic, add one or more of the matched articles as negative examples and go to step 2); and 5) if some articles on a topic are not listed as matching articles, add the articles as positive examples and go to step 2).

The foregoing process can be implemented in a machine learning interface. Through the interface, the biasing observed by a user during evaluation can sometimes be good enough to require no negative training examples, such as where the user at the top-level of training provides just one or more training examples and the system starts producing a fine evergreen index. The interface does not require the user to think about negative examples at all. Moreover, when a user looks at the matching articles for a topic, the "false positives" may become readily apparent, which is a natural point at which to introduce "negative examples" that the user then adds. In other words, by virtue of using a machine learning interface, the complexity of the interaction is deferred until needed and training becomes easy and natural for the user.

The candidate topic models 86 can include the same candidate topic models 86 used to originally build the evergreen index 88, as well as more positive and negative training examples, which have been automatically identified while maintaining the evergreen index, described infra, or added manually to the training sets 91, 92 based on expert knowledge.

In a further embodiment, an index founder specifies a set of online sources, such as Web sites, RSS Web feed, online papers, blogs, and other information feeds or sources, which he feels typify a core subject area. Alternatively, the founder could manually choose a starter set of articles from the sources, including via a drag-and-drop or point-and-choose user interface. The social indexing system starts collecting articles from the sources. After a few articles have arrived or been identified, the founder creates a short outline or list of topics and indicates which articles are positive examples of each topic. Initially, the system only trains on these positive training example articles to form an initial set of index patterns. The system then begins classifying articles from the information sources that match the index patterns for the topics. The founder can tune the performance of the topic model by editing the training set and retraining the system. The founder adds more positive and negative training examples based on the classification results. In a more mature evergreen index belonging to an active augmented community, members can give feedback to the system to indicate that certain articles may be misclassified. This feedback can be used to guide further training of the index patterns and the creation of new or revision of existing topics and subtopics. Other variations are possible.

In sustained operation, an evergreen index 88 is expected to evolve. Topics may be split or combined. The emphasis of topics may "drift" somewhat, and topics may be added or deleted. The training sets 91, 92 can be created automatically or selected manually. "Tricky" or "edge" training examples may be saved over many training sessions to guide the machine learning process. Representative citations could also be randomly selected from a larger corpus.

Seed Word Selection

Figure 7:
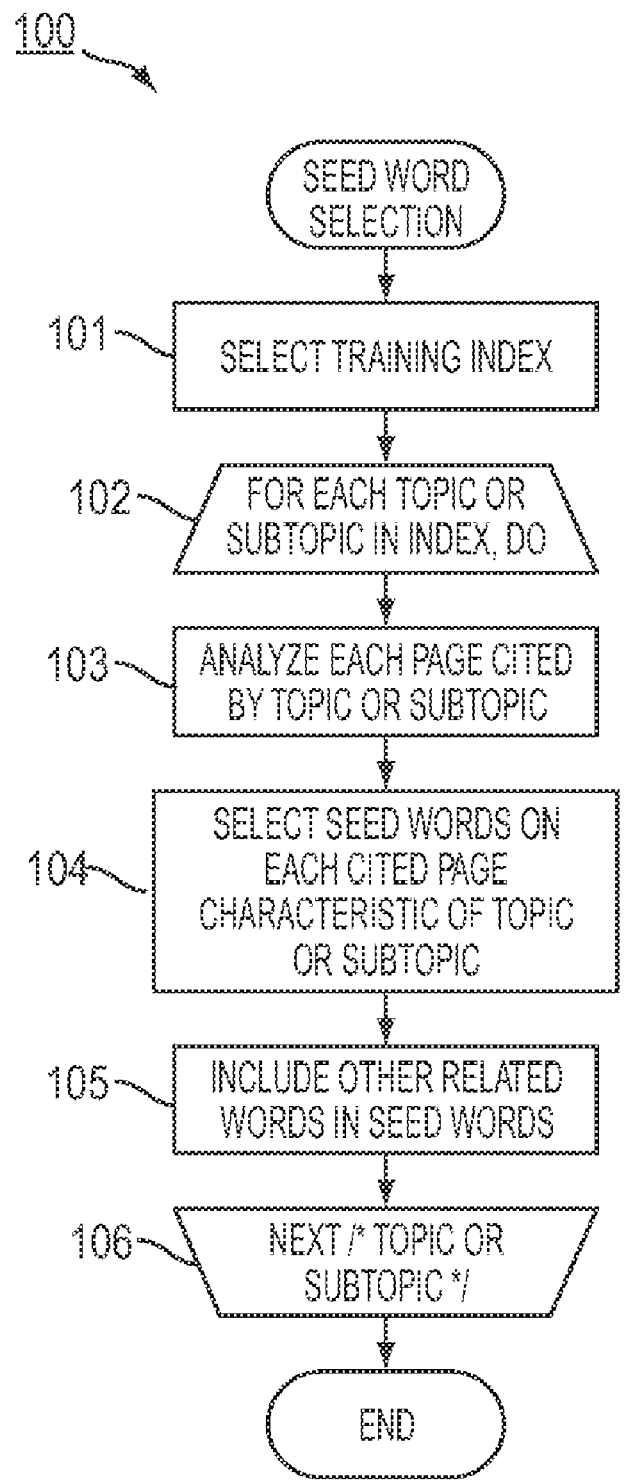
FIG. 7 is a flow diagram showing a routine for selecting seed words for use with the method of FIG. 6.

Seed words provide a starting point for index training. FIG. 7 is a flow diagram showing a routine 100 for selecting seed words for use with the method 80 of FIG. 6. Seed word selection begins with a training material 81 (step 101), which serves as a bootstrap for the evergreen index. A book index, for instance, on the right subject matter and representative of the language used could serve as training material. On the other hand, page citations lack index structure, but may nevertheless be representative.

The seed words are selected from each topic and subtopic in the training material 81 (steps 102-106). There are two distinct collections of articles used to compute seed words. First, a set of pages representative of the subject matter as a whole could be used to compute baseline word frequencies. Second, a set of pages representative of information on a topic could be used with pages needed for each topic to be trained. The pages will generally differ for each topic.

Each page cited by a topic or subtopic in the training material 81 is analyzed (step 103). As boundaries between book or Web pages, for instance, are imperfect dividers for topics, the algorithm identifies each page individually when topics run over several pages. Conversely, several topics may appear on a single page. In practice, though, most indexes cite multiple pages for each topic and, although each cited page may cover several topics, two pages cited for one topic do not often have the same additional topics. This randomized distribution of adjacent topics reduces and tends to neutralize their influence on word populations. The neutralizing effect gets stronger with increasing amounts of information and helps to disambiguate the association of seed words with topics and subtopics.

Seed words 84 on each page that are characteristic of the topic or subtopic are selected (step 104). A set of basis words are determined by comparing the frequencies of words appearing on the cited pages versus pages in the larger corpus. For example, words that have frequencies of occurrence substantially higher on cited pages than on other pages can be chosen as seed words 84. A subset of the basis words is chosen as the seed words 84 for the topic, which prioritizes the words that are most characteristic of the topic. Selection is also biased to include label words and words that often appear near label words, even if those words are not characteristic by themselves. Other related words can also be included as seed words 84 (step 105), such as words used in a subtopic label or which occur near a label word on the cited page. Each topic and subtopic in the training material 81 is selected in turn (step 106) until all have been examined.

The computation of seed words uses one set of training material, typically documents, to compute a "baseline" of word frequencies, and a second set of training material as a representative sample for the index. Word frequencies in representative sample articles can be compared to the word frequencies in the baseline sample articles using, for instance, term frequency-inverse document frequency (TF-HDF) weighting or other similar measures.

In one embodiment, the baseline can be computed using an entire book, which provides a representative sample for each topic based on its cited pages. In a further Web-based embodiment, new articles arrive all of the time in an evergreen index. The baseline for an index is computed from articles drawn from all of the information sources used by an augmented community. A parameter governs the maximum number of articles that will be used, while another parameter governs the maximum number of positive example pages used in the computation. The system takes a random sample of articles received by the community up to the limit specified by the parameter. These articles are used to compute the baseline word frequencies. The positive training examples are then used as the representative sample. This approach computes different seed words for each topic in a community based on the different representative sample for each topic. A social index serving multiple augmented communities would compute a different baseline for each community.

Topic Model Generation

Figure 8A:
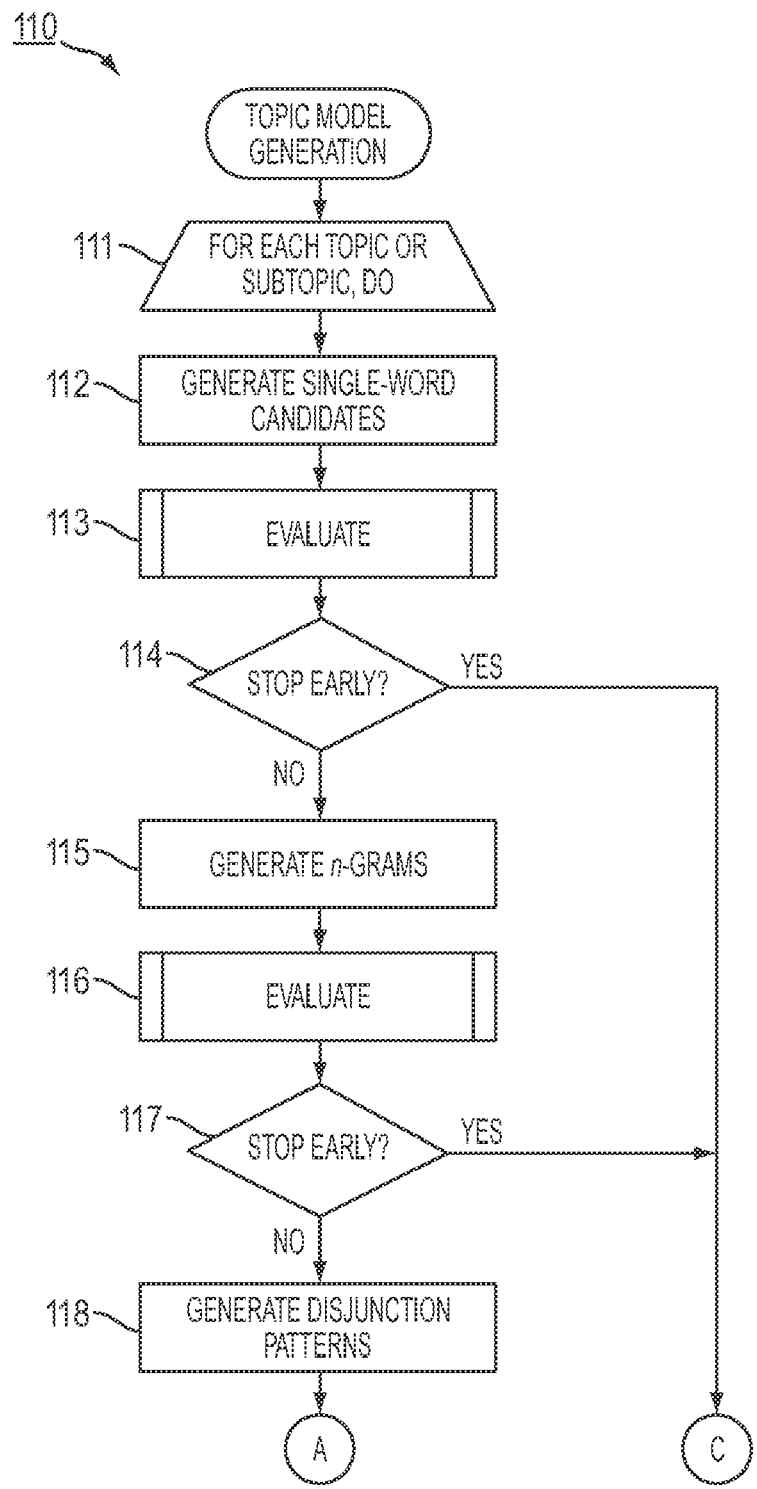
FIG. 8 is a flow diagram showing a routine for generating candidate topic models for use with the method of FIG. 6.
Figure 8B:
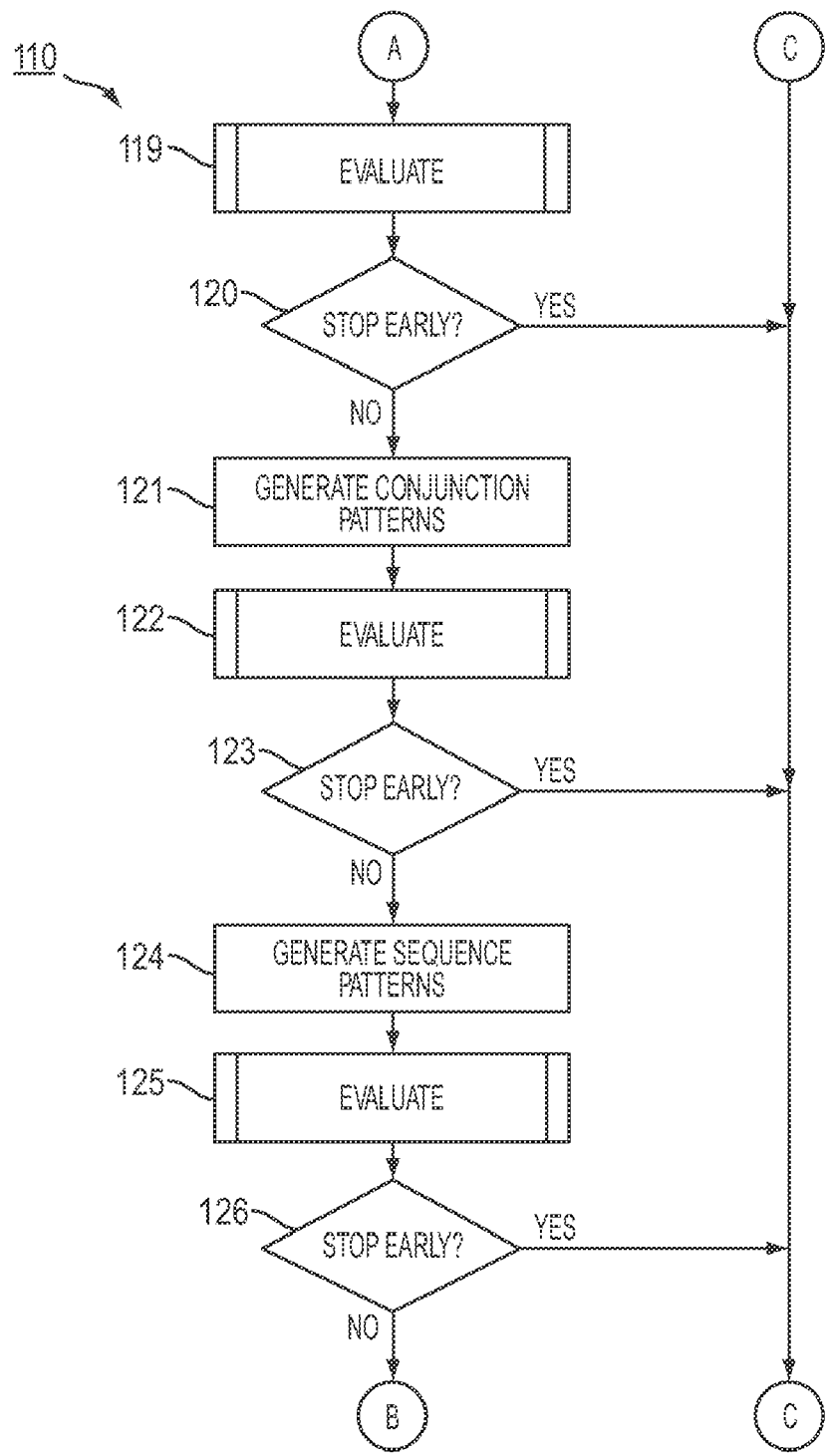
Figure 8C:
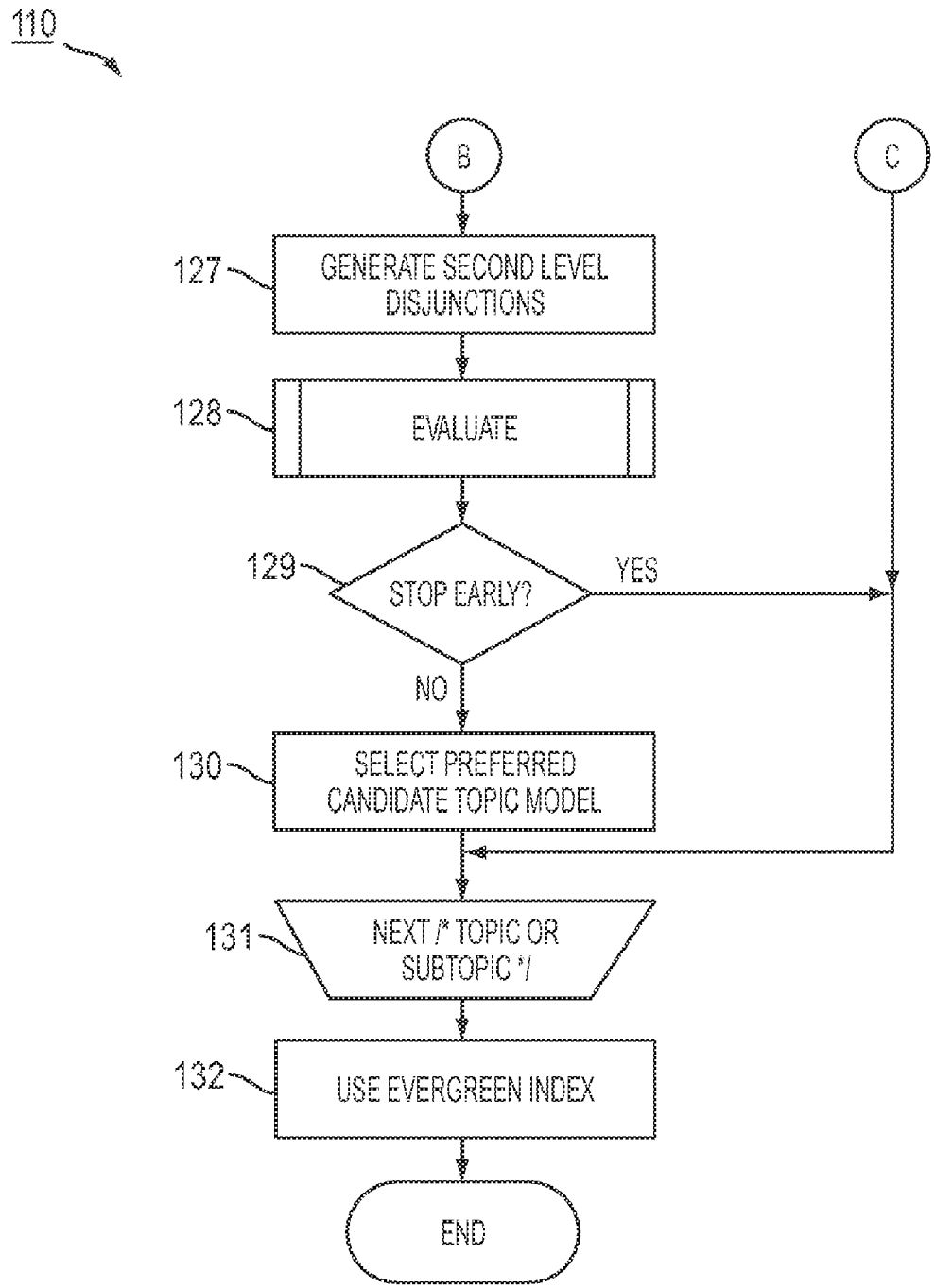

Candidate topic models 86 are generated from the seed words 84 to create a model for each topic. FIG. 8 is a flow diagram showing a routine 110 for generating candidate topic models 86 for use with the method 80 of FIG. 6. Topic models 86 transform direct page citations, such as found in a conventional index, into an expression that can be used to test whether a given text is on topic. Topic models can be specified as patterns, as described herein, as well as term vectors or any other form of testable expression.

Once the seed words 84 have been selected, supra, candidate topic models 86 are generated and evaluated for each of the topics and subtopics (steps 111-131). Each candidate topic model 86 contains one or more of the seed words 84 fashioned into a predicate using, for instance, a finite state pattern language to define a pattern. In addition, higher levels of semantic analysis could be employed to make up the elements of candidate patterns.

Each candidate topic model 86 can be single-level expressions over the seed words 84, or multi-level expressions that include other predicates as arguments. The candidate topic models 86 are generated in phases that progressively build up more complex candidate topic models 86 to be evaluated. The phases include:

1) generating single-word candidates (step 112);
2) generating n-grams (sequence no intervening words) (step 115);
3) generating disjunction patterns (logical OR) (step 118);
4) generating conjunction patterns (logical AND) (step 121);
5) generating sequence patterns (step 124); and
6) generating second level disjunction patterns (step 127).

Other phases and forms of candidate topic models 86, predicates, and recognition constraint expressions are possible. In each predicate, conjunction is indicated by left and right brackets. Disjunction is indicated by left and right parentheses. N-grams are indicated by curly left and right brackets. Names of disambiguated library patterns are preceded by a dollar sign.

Figure 9:
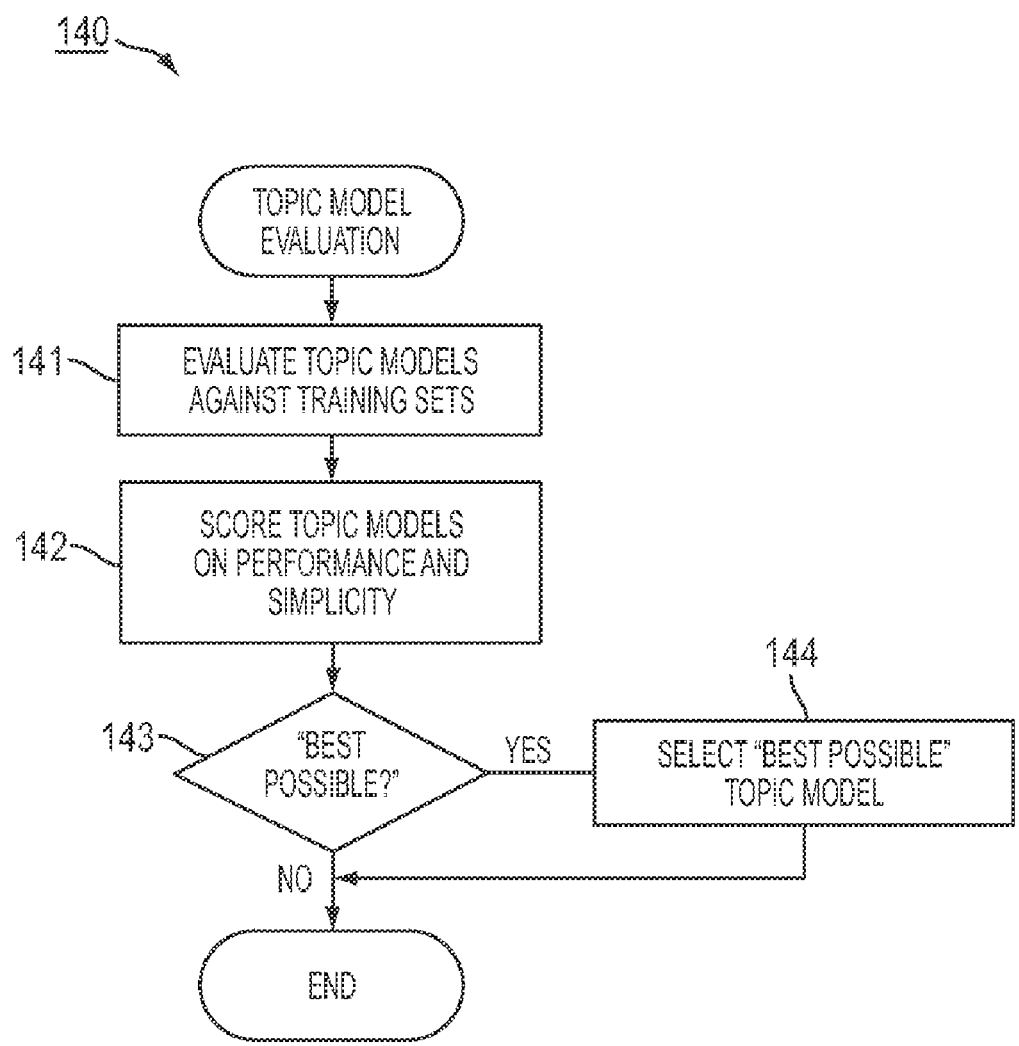
FIG. 9 is a flow diagram showing a routine for evaluating candidate topic models for use with the routine of FIG. 8.

Following each candidate topic model generation phase, the candidate topic models 86 are evaluated (steps 113, 116, 119, 122, 125, 128), which tests the candidate models against the positive and negative training sets 91, 92, and scores the candidate models on one or more of performance, simplicity, and biasing, as further described below with reference to FIG. 9. The candidate model generate-and-evaluate phases (steps 112-129) utilize a best-first, anytime algorithm that run independently for each topic being trained. When the algorithm has been run over all of the topics, the best patterns, that is, topic models, are saved and used to maintain the evergreen index.

During training, the algorithm attempts to visit the most likely parts of a candidate topic model search space first, and manage time and storage space budgets to focus the search. Branches of the search space are pruned early (steps 114, 117, 120, 123, 126, 129) if the branches cannot possibly yield candidates that will score better than topic models that have already been generated. As the candidate topic models 86 are generated in order of increasing complexity and decreasing probability, the best candidate topic models 86 are usually generated first. Since the best simple candidate topic models 86 will always dominate over the best candidate topic models 86 that are more complex, pattern generate-and-evaluate can stop early (steps 114, 117, 120, 123, 126, 129) if a high scoring simple candidate topic model 86 is found, since no later and more complex candidate topic model 86 could possibly score better. Consequently, the candidate topic models 86 resulting from the topic model generate-and-evaluate phases (steps 112-129) represent only the tip of the iceberg of the potential candidate topic models 86 because many candidate topic models are eliminated early after only a partial generation and partial evaluation cycle. Other candidate topic model generate-and-evaluate approaches are possible.

If all of the topic model generate-and-evaluate phases (steps 112-129) execute fully, that is, no early stoppage was possible, a preferred candidate topic model 86 must be selected from the topic models selected in each phase (step 130) by evaluating structural complexity and term overlap with the index label. Lower structural complexity and higher term overlap are preferred. The structural complexity of a candidate topic model is a measure that increases as a candidate topic model becomes more elaborate, with more predicates, terms, and levels. By favoring simple or low complexity candidate topic models, the topic model evaluator follows the philosophy of Occam's razor to choose the simplest candidate topic models that explain the data. Considerations of structural complexity are also helpful to avoid over-fitting in machine learning, especially when the training data is sparse. Candidate topic model 86 generation and evaluation continues for each remaining topic and subtopic (step 131).

learned, after which the best one is selected. FIG. 9 is a flow diagram showing a routine 140 for evaluating candidate topic models for use with the routine 110 of FIG. 8. The candidate topic models 86 are matched against the positive and negative training sets 91, 92 (step 141).

In one embodiment, the topic models need not necessarily be matched against an entire corpus. For instance, training sets can be generated from a book, in which the pages cited in the index are positive training examples and the remaining pages that are not cited in the index become negative examples. Together, the positive and negative examples make up the whole book, which is also the entire corpus. In a further embodiment, a list of topics is created and Web pages are selected from an online sources as positive training examples for each topic by an index founder. Negative training examples and further positive training examples are designated after the evergreen index has been populated with material from the online sources. In a still further embodiment, a representative training set could be selected from a lengthy

TABLE 1

| Index Entry | Generated Pattern | Meaning | Comments |
|---|---|---|---|
| Afghanistan: Soviet conflict with | [afghanistan with $Russia] | The term Afghanistan and the term "with" and the library pattern for "Russia." | The library pattern for Russia includes several variations like "former soviet union," USSR, and others. |
| aflatoxin | aflatoxin | The term "aflatoxin." | The pattern generator stopped when it found a single-word pattern that matched the citations perfectly. |
| African swine fever | {african swine fever} | The ngram "African swine fever" | The pattern generator stopped when it found an ngram that matched the citations perfectly. |
| Against the Grain {Yeltsin} | [yeltsin {against the grain}] | The term "Yeltsin" and the ngram "against the grain." | Yeltsin wrote an autobiography titled "Against the Grain." |
| Black Death | (bubonic {black death}) | The term "bubonic" or the ngram "Black Death." | This pattern scored as having greater simplicity than the more obvious pattern ({Black Death} {bubonic plague}) |
| Bonfire project | [bonfire (project program)] | The term "bonfire" and either the term "project" or the term "program." | The text interchangeably refers to this as a program or a project. |
| Biodefense: and superterrorism | [destruction mass (superterrorism terrorist)] | The term "destruction" and the term "mass" and either the term "superterrorism" or the term "terrorist." | The actual meaning of "superterrorism" is terrorists using weapons of mass destruction. |

Finally, upon completion of the hierarchical generate-and-test algorithm, each topic or subtopic 89 is represented in the evergreen index 88 by a topic model 90. The evergreen index 88 can then be used (step 132) by the augmented community for digital information discovery.

Topic Model Evaluation

The machine learning process is organized as a generate-and-test procedure. Candidate topic models 86 of increasing complexity are generated, supra, and progressively tested through a supervised learning process. The iterative selection of training examples is guided by interactions with a user, including information from the augmented community about previous miscategorizations, which can become negative training examples. Alternatively, several topic models can be corpus by having a trainer, such as an augmented community manager, designate positive and negative training examples that are saved each time for training.

Each candidate topic model 86 is rated on one or more of performance, simplicity, and biasing. Performance rates the matching of a candidate topic model against the corpus as a prediction that an article is "on topic." In the ideal case, a candidate topic model matches all of the positive training examples and does not match any of the negative training examples. If the candidate topic model fails to match any positive example or matches any negative example, the performance rating is scored lower. Simplicity specifies a preference of simpler candidate topic models over complex models. Finally, biasing prefers those candidate topic models that have term overlap with the topic labels over models that do not. During the rating of candidate topic models, both false positive and false negative matches are rated. The matching algorithms include considerations of subsets, generality, and credit assignment to accurately account for topic hierarchy. For example, if the candidate topic model for a parent topic matches certain pages not cited in the training data, yet these pages are already cited by one of its subtopics, the parent topic is not penalized for a false positive match.

A score is assigned to each candidate topic model 86 (step 142) according to how many correct and incorrect predictions they make relative to the training sets. The score reflects how well each topic model predicts the positive and negative training examples and is also based on its structural complexity and overlap with topic label words. The highest scores occur for candidate topic models 86 that perfectly predict the positive and negative training examples, have low structural complexity, and have substantial term overlap with the topic labels.

The "best possible" scores that can be achieved for different kinds of topic models are tracked. Since candidate topic models 86 are generated in order of increasing complexity and decreasing probability, the best candidate topic models 86 are usually generated first. In one embodiment, all of the topic models are retained and the best one is selected after all topic models have been generated. In a further embodiment, only the best topic model seen so far is kept, thereby replacing any earlier and lesser performing topic models. In a still further embodiment, if a "best possible" topic model is encountered (step 143), that topic model is selected (step 144) and serves to signal that topic model generation-and-evaluation may be stopped early, as the best simple topic models will always dominate over the best topic models that are more complex.

Index Extrapolation

Figure 10:
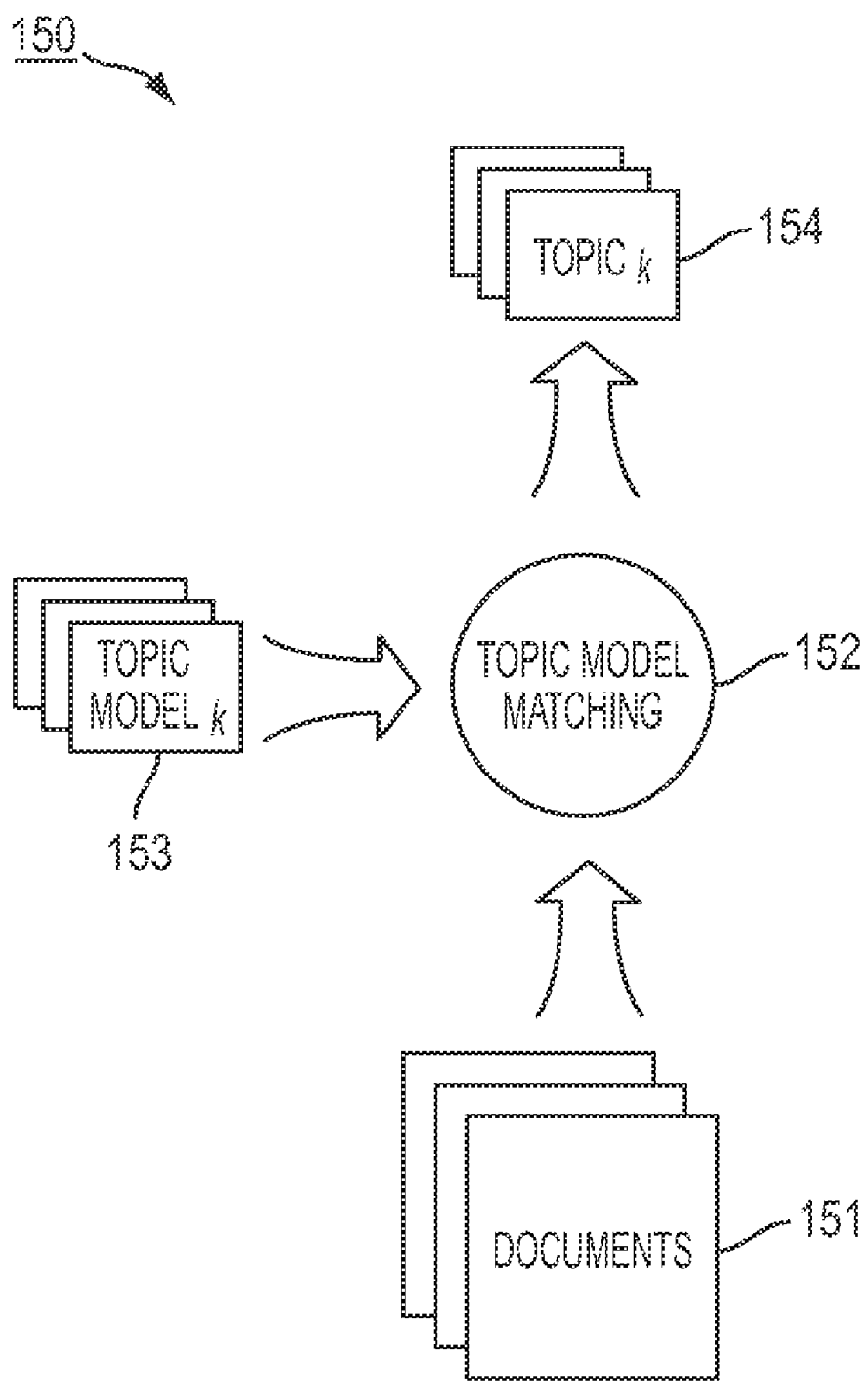
FIG. 10 is a data flow diagram showing index extrapolation in accordance with one embodiment.

Information discovery has two crucial aspects: (1) determining which pages are on each topic, which is addressed by index extrapolation, and (2) determining the quality of different pages, which is addressed by voting, discussed infra. Index extrapolation incorporates the "hard work of the few," that is, the index manager, who selects sources and trains the index by giving positive and negative training examples. Classification is performed when a new article arrives, a source is added to an augmented community's evergreen index, or the index has been retrained. The topic models 90 in an evergreen index 88 enable new and relevant digital information to be automatically categorized by topic 89 through a process of index extrapolation using supervised machine learning. FIG. 10 is a data flow diagram showing index extrapolation 150 in accordance with one embodiment. The method is performed as a series of process steps by a server or other computing device.

Unlike a conventional index, an evergreen index contains topic models instead of citations, which enables the evergreen index to function as a dynamic structure that is both untied to specific digital information and applicable over any digital information. Documents 151 are matched against the topic models 153 of an evergreen index to determine the topics or subtopics 154, which best fit the information (operation 152), as further described below with reference to FIG. 11. Not every document 151 will find a correctly matching topic model 153. Some information may be wrongly matched, while other information may not be matched at all, yet still be worthy of addition to the evergreen index as a new topic or subtopic.

Figure 11:
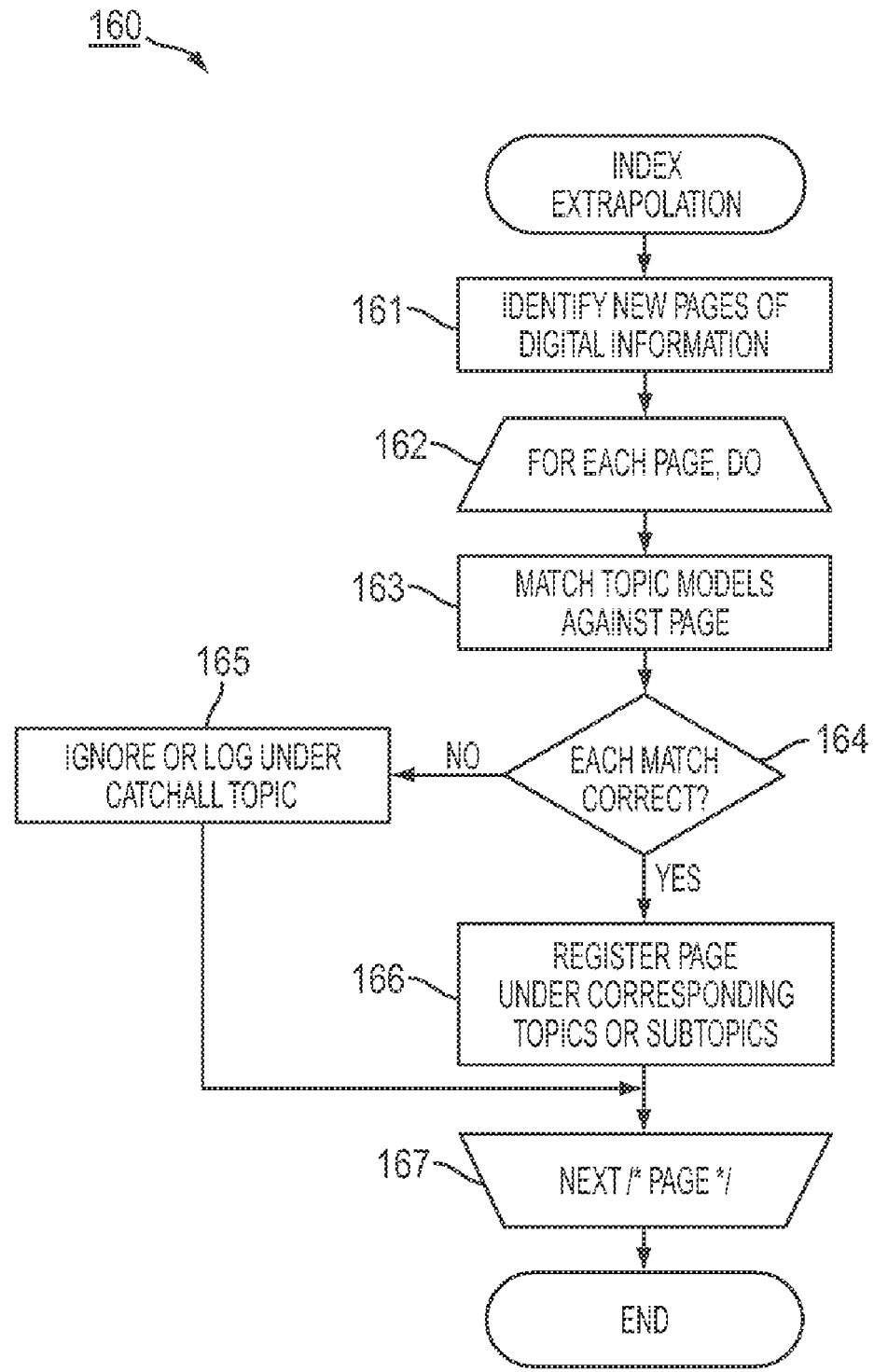
FIG. 11 is a flow diagram showing a routine for performing index extrapolation for use with the method of FIG. 10.

The automatic categorization of new digital information using an evergreen index is a continual process. FIG. 11 is a flow diagram showing a routine 160 for performing index extrapolation for use with the method of FIG. 10. New pages, articles, or other forms of digital information are identified (step 161), either automatically, such as through a Web crawler, or manually by the augmented community or others. For simplicity, the new digital information will simply be termed "pages."

Each page of new digital information is processed (steps 162-167). A page can match against one or more topics or subtopics, and the patterns that make up the topic models 153 in the evergreen index are matched against the page (step 163). If a page matches at least one topic or subtopic 154 (step 164), the page is registered into the evergreen index under those matching topics and subtopics 154 (step 166). However, if no match is found (step 164), the page is either ignored or logged into a catchall topic for the evergreen index (step 165). Unclassified pages can also be used supplementary to index extrapolation. For example, new topics for the community's attention might arise among unclassified pages and a representative sampling of the unclassified pages could be examined by some community members as grist for a social process supporting expansion of the index. If no topic model 153 matches the page, the page may be used as a new positive training example, such as for those pages that are worth keeping for a new topic or subtopic. The new topic or subtopic would be identified separately by a domain expert or other individual associated with the augmented community to which the evergreen index belongs. Alternatively, if a topic model 153 incorrectly matches a page, such as noticed by community members, the page may be used as a new negative training example.

User Interface

Information discovery in social indexing is the combination of index extrapolation with topic-delimited voting. Voting personifies the "light work of the many." Fine-grained categorization is crucial to voting because the categorization accounts for the assessment of the articles under each topic. Categorization ascertains which articles are the best and most worthy of the reader's attention. Voting is provided through a user interface that puts a face onto the evergreen index.

Figure 12:
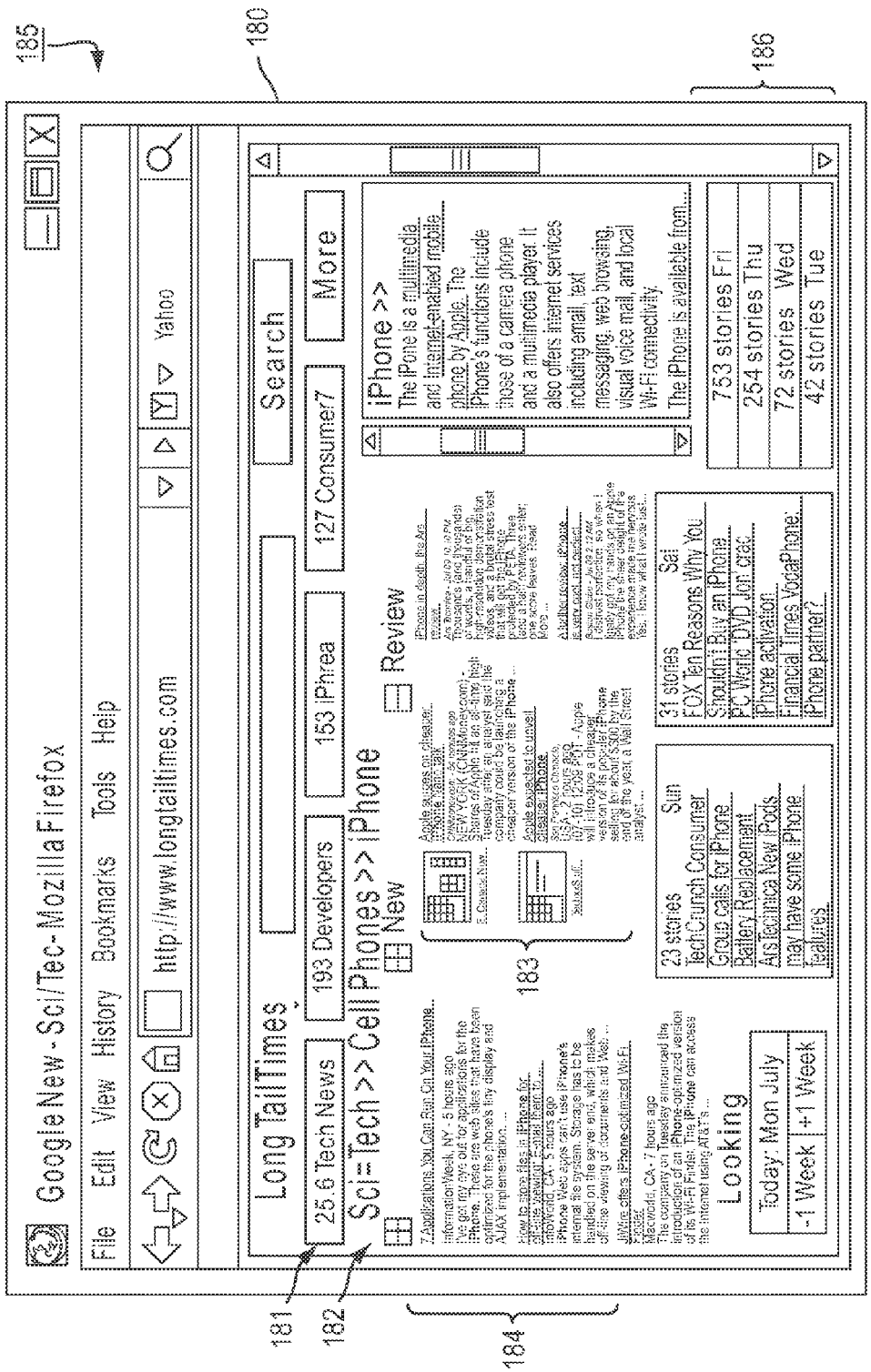
FIG. 12 is a screen shot diagram showing, by way of example, a user interface providing digital information organized by degree of interest.

Web browsers have become a ubiquitous and widely-adopted information provisioning interface, which provides an ideal, although non-exclusive, platform for spatially presenting new and relevant digital information. FIG. 12 is a screen shot diagram showing, by way of example, a user interface 180 providing digital information organized by degree of interest. The user interface 180 brings together the two aspects of an information diet, relevancy and degree of interest, with voting. The user interface 180 provides an illustrative presentation, but other interfacing methodologies are equally possible.

The ratings of digital information voted by each augmented community can be provided on individual Web pages indexed by tabs 181 or other markers. Within each augmented community's tab, the topics and subtopics 182 of that augmented community can be listed first, with larger fonts or more prominent display attributes highlighting the most popular documents. The topics and subtopics 182 are selected from the augmented community's evergreen index and the documents are identified by matching a corpus of digital information against the topic models in the evergreen index, as described supra.

Degree of interest (DOI) refers to a numeric measure that is derived and intended to reflect how interesting some information will be. DOI can be determined relative to a particular article on a given topic, and can also be computed to relate a secondary topic to a primary one. DOI can be tailored to an individual based on information specific to the individual's history or state. When available, DOI can be used to optimize the presentation of information so that information with the highest DOI is favored, such as by giving the information more space or prominence. For instance, the highest ranked pages 183 can be allocated the largest amount of space with graphics, title, information regarding the source of the article, and abstract all provided. Other information or forms of visual or display emphasis could also be provided. Similarly, less highly rated pages 184 can be allocated less space, no graphics, and use smaller font sizes. Finally, lowest rated pages 185 can be relegated to the bottom of the tab with only the source and title of the page provided. Summarizations of the numbers of overall pages 186 can also be included as a convenience.

While the invention has been particularly shown and described as referenced to the embodiments thereof, those skilled in the art will understand that the foregoing and other changes in form and detail may be made therein without departing from the spirit and scope.

What is claimed is:

1. A system for performing discovery of digital information in a subject area, comprising:
   an information collection maintained in a storage device; and
   a computer comprising a processor and memory within which code for execution by the processor is stored, comprising:
      a user interface of the computer configured to designate each of topics in a subject area, training material for the topics, and a corpus comprising electronically-stored digital information;
      a topic modeler configured to build candidate topic models on the computer, comprising:
         a seed word selector configured to select seed words for each of the topics, and
         a pattern generator configured to generate patterns from the seed words for each topic as candidate topic models for that topic;
      an index trainer to evaluate the topic models against the training material comprising:
         a pattern tester configured to match the patterns in each candidate topic model to the training material and to rate the candidate topic model based on topical prediction; and
         an index builder configured to build an evergreen index comprising topic models for each of the topics by pairing each topic to the candidate topic model that was best rated.

2. A system according to claim 1, further comprising: topic models further comprising:
   a performance evaluator configured to favor the candidate topic models for the selected topic based on how well each candidate topic model performs by assigning a higher score to those candidate topic models, which match all of the on topic information for the selected topic and do not match all of the off topic information for the selected topic.

3. A system according to claim 1, further comprising:
   a finite state topic modeler configured to form each topic model as a predicate in a finite state language, and to apply each predicate to the corpus as a query that returns those places in the corpus matched by the predicate.

4. A system according to claim 1, further comprising:
   a classifier configured to classify articles in the corpus against the topic models in the evergreen index; and
   a display configured to present through the user interface the classified articles in the evergreen index.

5. A system according to claim 1, wherein one or more subtopics under at least one of the topics are hierarchically structured.

6. A system according to claim 1, further comprising:
   a set of positive training examples maintained in the storage device and comprising articles in the corpus corresponding to correct citations for each topic model.

7. A system according to claim 6, further comprises:
   a set of negative training examples maintained in the storage device and comprising articles in the corpus corresponding to incorrect citations for each topic model.

8. A system according to claim 6, further comprising:
   a characteristic word selector configured to identify basis words that are characteristic of each topic and based on the articles in the positive training examples set, and to combine one or more of the basis words as seed words into each of the topic models for the topic.

9. A system according to claim 8, wherein additional words are included with the seed words comprising at least one of words in the topic and words proximate to labels in the corpus referenced by the citations of that topic.

10. A system according to claim 1, wherein the digital information comprises one or more of printed documents, Web pages, and material written in a digital media.

11. A system according to claim 1, further comprising:
    a structure evaluator configured to favor the candidate topic model for the selected topic comprising a simpler structure over those of the candidate topic for the selected topic comprising a complex structure by assigning a higher score to the simpler candidate topic models.

12. A system according to claim 1, further comprising:
    a bias evaluator configured to bias the candidate topic models for the selected topic that have term overlap with topic labels associated with the selected topic by assigning a higher score to the overlapping candidate topic models.

13. A method for performing discovery of digital information in a subject area, comprising:
    designating through a user interface of a computer a corpus comprising electronically-stored digital information, which are maintained in a storage device;
    selecting one or more topics and training material for the selected topics comprising on topic information and off topic information;
    building candidate topic models on the computer comprising:
       selecting seed words for each of the selected topics; and
       generating patterns from the seed words for each topic as candidate topic models for that topic;
    evaluating the candidate topic models for each selected topic against the training material comprising:
       matching the patterns in each candidate topic model to the training material;
       rating each candidate topic model for the selected topic comprising:
          assigning a higher score to each candidate topic model that matches the on topic information for the selected topic;
          assigning a lower score to each candidate topic model that does not match the on topic information for the selected topic;
          assigning a higher score to each candidate topic model that does not match the off topic information for the selected topic; and assigning a lower score to each candidate topic model that matches the off topic information for the selected topic; and building an evergreen index comprising topic models for each of the selected topics by pairing each topic to the candidate topic model that has the best overall score.

14. A method according to claim 13, further comprising:

favoring the candidate topic models for the selected topic based on how well each candidate topic model performs by assigning a higher score to those candidate topic models, which match all of the on topic information for the selected topic and do not match all of the off topic information for the selected topic.

15. A method according to claim 13, further comprising:

forming each topic model as a predicate in a finite state language; and applying each predicate to the corpus as a query that returns those places in the corpus matched by the predicate.

16. A method according to claim 13, further comprising:

classifying articles in the corpus against the topic models in the evergreen index; and presenting the classified articles in the evergreen index.

17. A method according to claim 13, further comprising:

hierarchically structuring one or more subtopics under at least one of the selected topics.

18. A method according to claim 13, further comprising:

specifying the on topic information by defining a set of positive training examples maintained in the storage device and comprising articles in the corpus corresponding to correct citations for each topic model.

19. A method according to claim 18, further comprises:

specifying the off topic information by defining a set of negative training examples maintained in the storage device and comprising articles in the corpus corresponding to incorrect citations for each topic model.

20. A method according to claim 18, further comprising:

identifying basis words that are characteristic of each topic and based on the articles in the positive training examples set; and combining one or more of the basis words as seed words into each of the topic models for the topic.

21. A method according to claim 20, further comprising:

including additional words with the seed words comprising at least one of words in the topic and words proximate to labels in the corpus referenced by the citations of that topic.

22. A method according to claim 13, wherein the digital information comprises one or more of printed documents, Web pages, and material written in a digital media.

23. A method according to claim 13, further comprising:

favoring the candidate topic model for the selected topic comprising a simpler structure over those of the candidate topic for the selected topic comprising a complex structure by assigning a higher score to the simpler candidate topic models.

24. A method according to claim 13, further comprising:

biasing the candidate topic models for the selected topic that have term overlap with topic labels associated with the selected topic by assigning a higher score to the overlapping candidate topic models.

25. An apparatus for performing discovery of digital information in a subject area, comprising:

means for designating through a user interface of a computer a corpus comprising electronically-stored digital information, which are maintained in a storage device;

means for selecting one or more topics and training material for the selected topics comprising on topic information and off topic information;

means for building candidate topic models on the computer comprising:

means for selecting seed words for each of the selected topics; and means for generating patterns from the seed words for each topic as candidate topic models for that topic;

means for evaluating the candidate topic models for each selected topic against the training material comprising:

means for matching the patterns in each candidate topic model to the training material;

means for rating each candidate topic model for the selected topic comprising:

means for assigning a higher score to each candidate topic model that matches the on topic information for the selected topic;

means for assigning a lower score to each candidate topic model that does not match the on topic information for the selected topic;

means for assigning a higher score to each candidate topic model that does not match the off topic information for the selected topic; and means for assigning a lower score to each candidate topic model that matches the off topic information for the selected topic; and means for building an evergreen index comprising topic models for each of the selected topics by pairing each topic to the candidate topic model that has the best overall score.

\* \* \* \* \*